(12) United States Patent
Gaal et al.

(10) Patent No.: US 10,999,886 B2
(45) Date of Patent: May 4, 2021

(54) TECHNIQUES FOR HARMONIZATION BETWEEN CRS AND DM-RS BASED TRANSMISSION MODES IN UNLICENSED SPECTRUM

(71) Applicant: QUALCOMM Incorporated, San Diego, CA (US)

(72) Inventors: Peter Gaal, San Diego, CA (US); Srinivas Yerramalli, San Diego, CA (US); Durga Prasad Malladi, San Diego, CA (US); Yongbin Wei, La Jolla, CA (US); Alexei Yurievitch Gorokhov, San Diego, CA (US); Brian Banister, San Diego, CA (US); Michael Lee McCloud, San Diego, CA (US); Tao Luo, San Diego, CA (US); Supratik Bhattacharjee, San Diego, CA (US); Chengjin Zhang, San Diego, CA (US); Ravi Teja Sukhavasi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/232,672

(22) Filed: Aug. 9, 2016

(65) Prior Publication Data
US 2017/0048919 A1    Feb. 16, 2017

Related U.S. Application Data

(60) Provisional application No. 62/203,295, filed on Aug. 10, 2015.

(51) Int. Cl.
*H04W 76/28*    (2018.01)
*H04L 5/14*    (2006.01)
(Continued)

(52) U.S. Cl.
CPC .......... *H04W 76/28* (2018.02); *H04B 7/0626* (2013.01); *H04L 5/005* (2013.01);
(Continued)

(58) Field of Classification Search
None
See application file for complete search history.

(56) References Cited

U.S. PATENT DOCUMENTS

| 8,989,174 B2 | 3/2015 | Montojo et al. |
| 9,131,351 B2 | 9/2015 | Malladi et al. |

(Continued)

FOREIGN PATENT DOCUMENTS

| CN | 102461219 A | 5/2012 |
| WO | 2010110584 A3 | 1/2011 |

(Continued)

OTHER PUBLICATIONS

Mediatek Inc: "LAA frame Structure Design," 3GPP Draft; R1-153254 LAA Frame Structure Design, 3rd Generation Partnership Project (3GPP), Mobile Competence Centre; 650, Route Des Lucioles; F-06921 Sophia-Antipolis Cedex; France, vol. RAN WG1, No. Fukuoko, Japan; May 25, 2015-May 29, 2015, May 24, 2015, XP050970506, Retrieved from the Internet: URL:http://www.3gpp.org/ftp/Meetings_3GPP_SYNC/RAN1/Docs/ [retrieved on May 24, 2015], Section 2, 3 Section 6, par. 3—end Section 7, par. 3-6. (8 pages).

(Continued)

*Primary Examiner* — Faruk Hamza
*Assistant Examiner* — Cassandra L Decker
(74) *Attorney, Agent, or Firm* — Qualcomm Incorporated

(57) ABSTRACT

Various aspects related to techniques for harmonization between common reference signal (CRS) and demodulation reference signal (DM-RS) based transmission modes (TMs) in unlicensed spectrum are described. In one aspect, a (Continued)

downlink/uplink (DL/UL) subframe configuration may be signaled for each subframe. Information provided by the DL/UL subframe configuration may indicate whether the respective downlink subframe is a single-frequency network (MBSFN) subframe (associated with DM-RS-based TM) or a non-MBSFN subframe (associated with CRS-based TM). In another aspect, periodic as well as aperiodic channel state information (CSI) reporting requests may be supported. In yet another aspect, discontinued reception (DRX) wake ups for unlicensed carriers may be explicitly or implicitly indicated to a user equipment (UE) via a carrier in a licensed spectrum.

48 Claims, 18 Drawing Sheets

(51) Int. Cl.
| | |
|---|---|
| H04L 5/00 | (2006.01) |
| H04B 7/06 | (2006.01) |
| H04W 72/00 | (2009.01) |
| H04W 72/04 | (2009.01) |
| H04W 72/14 | (2009.01) |
| H04L 27/00 | (2006.01) |

(52) U.S. Cl.
CPC .......... *H04L 5/0051* (2013.01); *H04L 5/1469* (2013.01); *H04W 72/005* (2013.01); *H04W 72/042* (2013.01); *H04W 72/0413* (2013.01); *H04W 72/0446* (2013.01); *H04W 72/14* (2013.01); *H04L 5/001* (2013.01); *H04L 27/0006* (2013.01)

(56) References Cited

U.S. PATENT DOCUMENTS

| | | | | |
|---|---|---|---|---|
| 9,351,293 | B2 | 5/2016 | Chen et al. | |
| 2009/0241004 | A1* | 9/2009 | Ahn | H04L 5/0055 714/749 |
| 2010/0303013 | A1* | 12/2010 | Khandekar | H04W 99/00 370/328 |
| 2011/0149832 | A1* | 6/2011 | Kim | H04W 72/005 370/312 |
| 2011/0275363 | A1* | 11/2011 | Kwon | H04L 5/00 455/422.1 |
| 2012/0099434 | A1 | 4/2012 | Sun et al. | |
| 2013/0064216 | A1* | 3/2013 | Gao | H04L 5/0016 370/330 |
| 2013/0272170 | A1* | 10/2013 | Chatterjee | H04W 28/02 370/280 |
| 2013/0301490 | A1* | 11/2013 | He | H04W 4/90 370/280 |
| 2014/0098721 | A1* | 4/2014 | Chen | H04W 72/005 370/280 |
| 2014/0301280 | A1* | 10/2014 | Che | H04L 5/0082 370/329 |
| 2014/0314041 | A1* | 10/2014 | Kim | H04L 5/0048 370/329 |
| 2015/0003316 | A1* | 1/2015 | Kim | H04L 5/0055 370/312 |
| 2015/0003407 | A1* | 1/2015 | Seo | H04L 25/0224 370/330 |
| 2015/0085723 | A1* | 3/2015 | Chen | H04W 72/042 370/280 |
| 2015/0098384 | A1* | 4/2015 | Deng | H04L 5/0053 370/312 |
| 2015/0117294 | A1* | 4/2015 | Li | H04W 72/0446 370/312 |
| 2015/0156006 | A1* | 6/2015 | Takano | H04W 72/042 370/280 |
| 2015/0163823 | A1 | 6/2015 | Sadek et al. | |
| 2015/0215094 | A1* | 7/2015 | Meng | H04L 1/1861 370/280 |
| 2015/0236828 | A1* | 8/2015 | Park | H04L 5/0094 375/340 |
| 2015/0327226 | A1* | 11/2015 | Cheng | H04W 74/08 370/329 |
| 2016/0073366 | A1* | 3/2016 | Ng | H04W 56/001 370/329 |
| 2016/0192396 | A1* | 6/2016 | Ng | H04W 74/0808 370/329 |
| 2016/0270100 | A1* | 9/2016 | Ng | H04L 5/001 |
| 2016/0286423 | A1* | 9/2016 | Zhu | H04W 24/02 |
| 2016/0338018 | A1* | 11/2016 | Awad | H04L 5/0053 |
| 2017/0223663 | A1* | 8/2017 | Mizusawa | H04W 4/06 |
| 2017/0289818 | A1* | 10/2017 | Ng | H04W 16/14 |
| 2017/0332245 | A1* | 11/2017 | Huang | H04W 16/14 |
| 2018/0220459 | A1* | 8/2018 | Park | H04W 48/10 |
| 2019/0058544 | A1* | 2/2019 | Beale | H04W 72/0446 |

FOREIGN PATENT DOCUMENTS

| | | |
|---|---|---|
| WO | 2011032035 A2 | 3/2011 |
| WO | 2011044290 | 4/2011 |
| WO | 2013165572 | 11/2013 |

OTHER PUBLICATIONS

Panasonic: "MBSFN subframes and downlink channel reception in MTC", 3GPP Draft; R1-152910, 3rd Generation Partnership Project (3GPP), Mobile Competence Centre; 650, Route Des Lucioles; F-06921 Sophia-Antipolis Cedex; France, vol. RAN WG1, No. Fukuoka, Japan; May 25, 2015-May 29, 2015, May 15, 2015, XP050969367, Retrieved from the Internet: URL:http://www.3gpp.org/ftp/tsg_ran/WG1_RL1/TSGR1_81_Docs/ [retrieved on May 15, 2015] section 2; figure 1. (2 pages).
Partial International Search Report—PCT/US2016/046322—ISA/ EPO—dated Oct. 10, 2016. (8 pages).
ZTE: "Discussion on SIB and Paging for MTC enhancement," 3GPP Draft; R1-151732, 3rd Generation Partnership Project (3GPP), Mobile Competence Centre; 650, Route Des Lucioles; F-06921 Sophia-Antipolis Cedex; France, vol. RAN WG1, No. Belgrade, Serbia; Apr. 20, 2015-Apr. 24, 2015, Apr. 19, 2015, XP050934593, Retrieved from the Internet: URL:http://www.3gpp.org/ftp/Meetings_ 3GPP_SYNC/RAN1/Docs/ [retrieved on Apr. 19, 2015] section 3, par. 1, 2 below Fig. 3.1. (8 pages).
International Search Report and Written Opinion—PCT/US2016/ 046322—ISA/EPO—Feb. 7, 2017. 23 pages.
Motorola Mobility: "Further Discussions on Physical Layer enhancement options for LAA-LTE", 3GPP Draft, R1-151987 Phylayeroptions V2, 3RO Generation Partnership Project {3GPP), Mobile Competence Centre, 650, Route Des Lucioles, F-06921 Sophia-Antipolis Cedex, France, vol. RAN WG1, No. Belgrade, Serbia, Apr. 20, 2015-Apr. 24, 2015, Apr. 19, 2015, XP050934838, Retrieved from the Internet: URL:http://www.3gpp.org/ftp/Meetings_3GPPSYNC/ RAN1/Docs/. 7 pages.
Qualcomm Incorporated: "DRX Operation and PHY Layer Aspects in LAA", 3GPP Draft, R1-152787, 3rd Generation Partnership Project (3GPP), Mobile Competence Centre, 650, Route Des Lucioles, F-06921, Sophia-Antipolis Cedex, Fra, vol. RAN WG1, No. Fukuoka, Japan; May 25, 2015-May 29, 2015, May 24, 2015, XP050973258, Retrieved from the Internet : URL:http://www.3gpp. org/ftp/ MeetingsGPPSYNC/RAN1/Docs/. 3 pages.
Qualcomm Incorporated: "UE Procedure for Receiving DL Transmissions in LAA", 3GPP Draft, R1-152786, 3rd Generation Partnership Project (3GPP), Mobile Competence Centre, 650, Route Des Lucioles, F-06921, Sophia-Antipolis Cedex, vol. RAN WG1, No. Fukuoka, Japan, May 25, 2015-May 29, 2015, May 24, 2015, XP050973248, Retrieved from the Internet: URL:http://www. 3gpp..org/ftp/Meetings3GPPYNC/RAN1/DOCS/. 3 pages.

(56) References Cited

OTHER PUBLICATIONS

Ericsson: "On Dynamic DU/UL Scheduling", 3GPP Draft; R1-153132, 3rd Generation Partnership Project (3GPP), Mobile Competence Centre; 650, Route Des Lucioles; F-06921 Sophia-Antipolis Cedex; France, vol. RAN WG1, No. Fukuoka, Japan; May 25, 2015-May 29, 2015, May 24, 2015 (May 24, 2015), 4 pages, XP050970668, Retrieved from the Internet: URL: http://www.3gpp.org/ftp/Meetings_3Gpp_SYNC/RAN1/Docs/ (retrieved on May 24, 2015).

Taiwan Search Report—TW105125472—TIPO—Apr. 8, 2020.

* cited by examiner

TECHNIQUES FOR HARMONIZATION BETWEEN CRS AND DM-RS BASED TRANSMISSION MODES IN UNLICENSED SPECTRUM

CROSS-REFERENCE TO RELATED APPLICATIONS

The present Application for Patent claims priority to U.S. Provisional Application No. 62/203,295 entitled "TECHNIQUES FOR HARMONIZATION BETWEEN CRS AND DM-RS BASED TRANSMISSION MODES IN UNLICENSED SPECTRUM" filed Aug. 10, 2015, which is assigned to the assignee hereof and hereby expressly incorporated by reference herein.

BACKGROUND

Aspects of this disclosure relate generally to telecommunications, and more particularly to techniques for harmonization between common reference signal (CRS) and demodulation reference signal (DM-RS) based transmission modes (TMs) in unlicensed spectrum.

Wireless communications networks are widely deployed to provide various communication services such as voice, video, packet data, messaging, broadcast, and the like. These wireless networks may be multiple-access networks capable of supporting multiple users by sharing the available network resources.

A wireless communications network may include a number of network entities. The network entities of a cellular network (e.g., wireless wide area network or WWAN) may include a number of base stations, such as NodeBs (NBs) or evolved NodeBs (eNBs). The network entities of a wireless local area network (WLAN) may include a number of WLAN network entities, such access points (APs), which may referred to as Wi-Fi nodes. Each network entity may support communication for a number of user equipments (UEs) and may often communicate with multiple UEs at the same time. Similarly, each UE may communicate with a number of network entities, and may sometimes communicate with multiple network entities and/or network entities employing different access technologies. A network entity may communicate with a UE via downlink and uplink. The downlink (or forward link) refers to the communication link from the network entity to the UE, and the uplink (or reverse link) refers to the communication link from the UE to the network entity.

As cellular networks become more congested, operators are beginning to look at ways to increase capacity. One approach may include the use of WLANs to offload some of the traffic and/or signaling of a cellular network (e.g., long term evolution or LTE). WLANs (or Wi-Fi networks) are attractive because, unlike cellular networks that operate in a licensed spectrum, Wi-Fi networks generally operate in an unlicensed or shared spectrum. However, access to unlicensed spectrum may need coordination to ensure that network entities of the same or different operator deployments, using the same or different techniques for accessing the unlicensed spectrum, can co-exist and make effective use of the unlicensed spectrum.

As such, and given the growing use of the unlicensed spectrum, techniques are needed to provide efficient and improved processes to at least support multiple transmission modes.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, a present method for harmonizing between CRS and DM-RS based TMs in unlicensed spectrum is provided. The described aspects include identifying a subframe configuration (e.g., a downlink/uplink subframe configuration or DL/UL subframe configuration) for WWAN communications over an unlicensed spectrum, the subframe configuration indicating whether a respective downlink subframe in a transmission burst corresponds to a multicast-broadcast single-frequency network (MBSFN) subframe or a non-MBSFN subframe. The described aspects further include transmitting an indication of the subframe configuration to at least one UE.

In another aspect, a present apparatus for harmonizing between CRS and DM-RS based TMs in unlicensed spectrum may include memory configured to store instructions, and one or more processors communicatively coupled with the memory, wherein the one or more processors and the memory are configured to identify a subframe configuration (e.g., a downlink/uplink subframe configuration or DL/UL subframe configuration) for WWAN communications over an unlicensed spectrum, the subframe configuration indicating whether a respective downlink subframe in a transmission burst corresponds to a MBSFN subframe or a non-MBSFN subframe. The described aspects further transmit an indication of the subframe configuration to at least one UE.

In another aspect, a present computer-readable medium may store computer executable code for harmonizing between CRS and DM-RS based TMs in unlicensed spectrum. The described aspects include code for identifying a subframe configuration (e.g., a downlink/uplink subframe configuration or DL/UL subframe configuration) for WWAN communications over an unlicensed spectrum, the subframe configuration indicating whether a respective downlink subframe in a transmission burst corresponds to a MBSFN subframe or a non-MBSFN subframe. The described aspects further include code for transmitting an indication of the subframe configuration to at least one UE.

In another aspect, a present apparatus for harmonizing between CRS and DM-RS based TMs in unlicensed spectrum may include means for identifying a subframe configuration (e.g., a downlink/uplink subframe configuration or DL/UL subframe configuration) for WWAN communications over an unlicensed spectrum, the subframe configuration indicating whether a respective downlink subframe in a transmission burst corresponds to a MBSFN subframe or a non-MBSFN subframe. The described aspects further include means for transmitting an indication of the subframe configuration to at least one UE.

In accordance with another aspect, a present method for harmonizing between CRS and DM-RS based TMs in unlicensed spectrum is provided. The described aspects include receiving, from a network entity, an indication of a subframe configuration for WWAN communications over an unlicensed spectrum, the subframe configuration being associated with a current downlink subframe in a transmission burst. The described aspects further include determining whether the current downlink subframe is an MBSFN subframe or a non-MBSFN subframe based on the indication.

In another aspect, a present apparatus for harmonizing between CRS and DM-RS based TMs in unlicensed spectrum may include memory configured to store instructions, and one or more processors communicatively coupled with the memory, wherein the one or more processors and the memory are configured to receive, from a network entity, an indication of a subframe configuration for WWAN communications over an unlicensed spectrum, the subframe configuration being associated with a current downlink subframe in a transmission burst. The described aspects further determine whether the current downlink subframe is an MBSFN subframe or a non-MBSFN subframe based on the indication.

In another aspect, a present computer-readable medium may store computer executable code for harmonizing between CRS and DM-RS based TMs in unlicensed spectrum. The described aspects include code for receiving, from a network entity, an indication of a subframe configuration for WWAN communications over an unlicensed spectrum, the subframe configuration being associated with a current downlink subframe in a transmission burst. The described aspects further include code for determining whether the current downlink subframe is an MBSFN subframe or a non-MBSFN subframe based on the indication.

In another aspect, a present apparatus for harmonizing between CRS and DM-RS based TMs in unlicensed spectrum may include means for receiving, from a network entity, an indication of a subframe configuration for WWAN communications over an unlicensed spectrum, the subframe configuration being associated with a current downlink subframe in a transmission burst. The described aspects further include means for determining whether the current downlink subframe is an MBSFN subframe or a non-MBSFN subframe based on the indication.

In accordance with another aspect, a present method for harmonizing between CRS and DM-RS based TMs in unlicensed spectrum is provided. The described aspects include identifying aperiodically transmitted resources for channel state information (CSI) associated with WWAN communications over an unlicensed spectrum. The described aspects further include transmitting an indication of the resources and a request for aperiodic CSI reporting to a set of UE.

In another aspect, a present apparatus for harmonizing between CRS and DM-RS based TMs in unlicensed spectrum may include memory configured to store instructions, and one or more processors communicatively coupled with the memory, wherein the one or more processors and the memory are configured to identify aperiodically transmitted resources for CSI associated with WWAN communications over an unlicensed spectrum. The described aspects further transmit an indication of the resources and a request for aperiodic CSI reporting to a set of UE.

In another aspect, a present computer-readable medium may store computer executable code for harmonizing between CRS and DM-RS based TMs in unlicensed spectrum. The described aspects include code for identifying aperiodically transmitted resources for CSI associated with WWAN communications over an unlicensed spectrum. The described aspects further include code for transmitting an indication of the resources and a request for aperiodic CSI reporting to a set of UE.

In another aspect, a present apparatus for harmonizing between CRS and DM-RS based TMs in unlicensed spectrum may include means for identifying aperiodically transmitted resources for CSI associated with WWAN communications over an unlicensed spectrum. The described aspects further include means for transmitting an indication of the resources and a request for aperiodic CSI reporting to a set of UE.

In accordance with another aspect, a present method for harmonizing between CRS and DM-RS based TMs in unlicensed spectrum is provided. The described aspects include receiving, from a network entity, an indication of aperiodically transmitted resources for CSI associated with WWAN communications over an unlicensed spectrum, and a request for aperiodic CSI reporting. The described aspects further include performing CSI measurements and the aperiodic CSI reporting based at least in part on the indication of the resources.

In another aspect, a present apparatus for harmonizing between CRS and DM-RS based TMs in unlicensed spectrum may include memory configured to store instructions, and one or more processors communicatively coupled with the memory, wherein the one or more processors and the memory are configured to receive, from a network entity, an indication of aperiodically transmitted resources for CSI associated with WWAN communications over an unlicensed spectrum, and a request for aperiodic CSI reporting. The described aspects further perform CSI measurements and the aperiodic CSI reporting based at least in part on the indication of the resources.

In another aspect, a present computer-readable medium may store computer executable code for harmonizing between CRS and DM-RS based TMs in unlicensed spectrum. The described aspects include code for receiving, from a network entity, an indication of aperiodically transmitted resources for CSI associated with WWAN communications over an unlicensed spectrum, and a request for aperiodic CSI reporting. The described aspects further include code for performing CSI measurements and the aperiodic CSI reporting based at least in part on the indication of the resources.

In another aspect, a present apparatus for harmonizing between CRS and DM-RS based TMs in unlicensed spectrum may include means for receiving, from a network entity, an indication of aperiodically transmitted resources for CSI associated with WWAN communications over an unlicensed spectrum, and a request for aperiodic CSI reporting. The described aspects further include code for performing CSI measurements and the aperiodic CSI reporting based at least in part on the indication of the resources.

In accordance with another aspect, a present method for harmonizing between CRS and DM-RS based TMs in unlicensed spectrum is provided. The described aspects include determining that a UE is to wake up in an unlicensed spectrum from a discontinuous reception (DRX) OFF period to handle one or more carriers over the unlicensed spectrum. The described aspects further include transmitting, via a carrier in a licensed spectrum, an indication to the UE to wake up in the unlicensed spectrum from the DRX OFF period.

In another aspect, a present apparatus for harmonizing between CRS and DM-RS based TMs in unlicensed spectrum may include memory configured to store instructions, and one or more processors communicatively coupled with the memory, wherein the one or more processors and the memory are configured to determine that a UE is to wake up in an unlicensed spectrum from a DRX OFF period to handle one or more carriers over the unlicensed spectrum. The described aspects further transmit, via a carrier in a licensed spectrum, an indication to the UE to wake up in the unlicensed spectrum from the DRX OFF period.

In another aspect, a present computer-readable medium may store computer executable code for harmonizing between CRS and DM-RS based TMs in unlicensed spectrum. The described aspects include code for determining that a UE is to wake up in an unlicensed spectrum from a DRX OFF period to handle one or more carriers over the unlicensed spectrum. The described aspects further include code for transmitting, via a carrier in a licensed spectrum, an indication to the UE to wake up in the unlicensed spectrum from the DRX OFF period.

In another aspect, a present apparatus for harmonizing between CRS and DM-RS based TMs in unlicensed spectrum may include means for determining that a UE is to wake up in an unlicensed spectrum from a DRX OFF period to handle one or more carriers over the unlicensed spectrum. The described aspects further include code for transmitting, via a carrier in a licensed spectrum, an indication to the UE to wake up in the unlicensed spectrum from the DRX OFF period.

In accordance with another aspect, a present method for harmonizing between CRS and DM-RS based TMs in unlicensed spectrum is provided. The described aspects include receiving, at a UE and via a carrier in a licensed spectrum, an indication that the UE is to wake up in an unlicensed spectrum from a DRX OFF period to handle one or more carriers over the unlicensed spectrum. The described aspects further include waking up in the unlicensed spectrum from the DRX OFF period in response to receiving the indication.

In another aspect, a present apparatus for harmonizing between CRS and DM-RS based TMs in unlicensed spectrum may include memory configured to store instructions, and one or more processors communicatively coupled with the memory, wherein the one or more processors and the memory are configured to receive, at a UE and via a carrier in a licensed spectrum, an indication that the UE is to wake up in an unlicensed spectrum from a DRX OFF period to handle one or more carriers over the unlicensed spectrum. The described aspects further wake up in the unlicensed spectrum from the DRX OFF period in response to receiving the indication.

In another aspect, a present computer-readable medium may store computer executable code for harmonizing between CRS and DM-RS based TMs in unlicensed spectrum. The described aspects include code for receiving, at a UE and via a carrier in a licensed spectrum, an indication that the UE is to wake up in an unlicensed spectrum from a DRX OFF period to handle one or more carriers over the unlicensed spectrum. The described aspects further include code for waking up in the unlicensed spectrum from the DRX OFF period in response to receiving the indication.

In another aspect, a present apparatus for harmonizing between CRS and DM-RS based TMs in unlicensed spectrum may include means for receiving, at a UE and via a carrier in a licensed spectrum, an indication that the UE is to wake up in an unlicensed spectrum from a DRX OFF period to handle one or more carriers over the unlicensed spectrum. The described aspects further include means for waking up in the unlicensed spectrum from the DRX OFF period in response to receiving the indication.

Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout, where dashed lines may indicate optional components or actions, and wherein.

DETAILED DESCRIPTION

Figure 1:
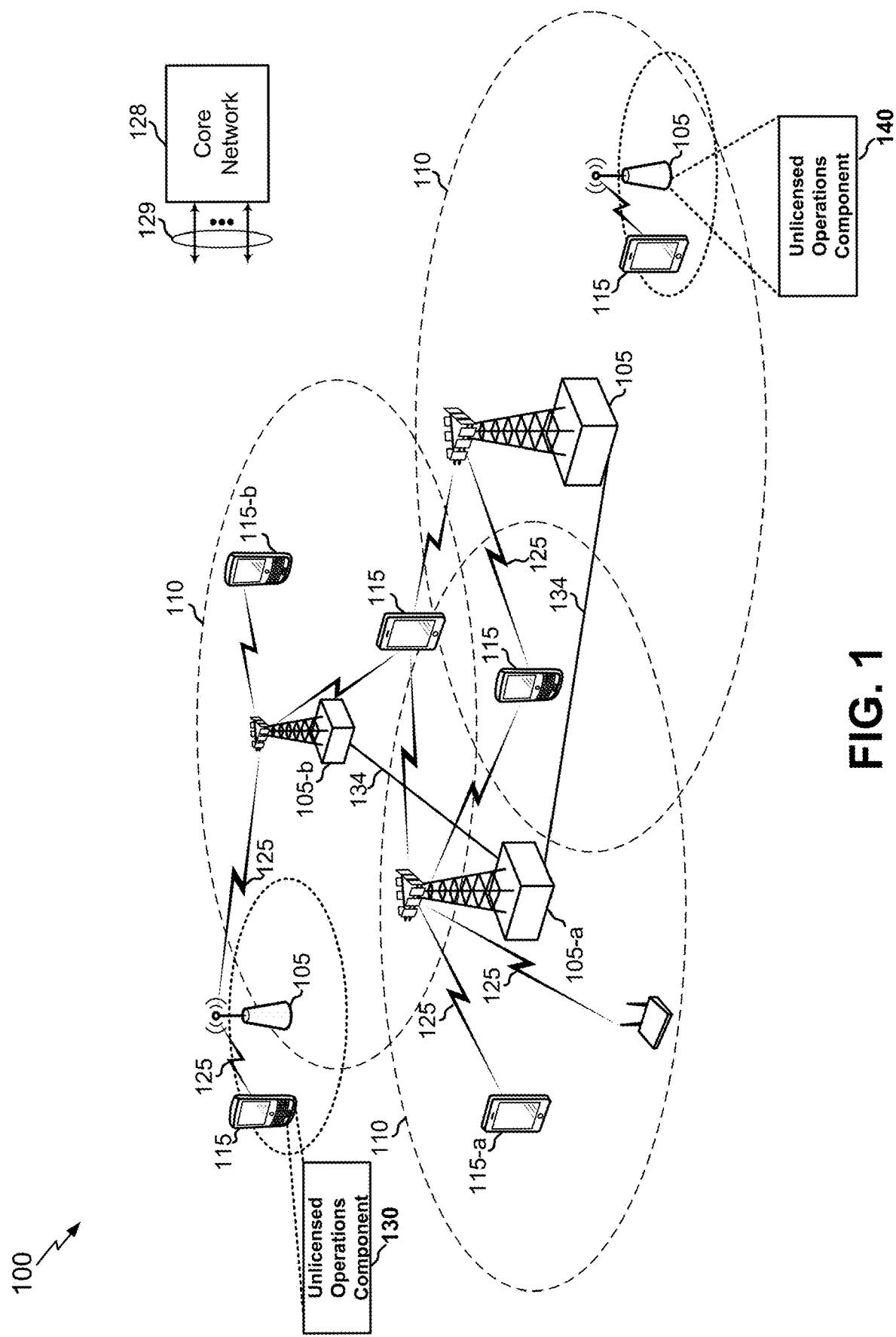
FIG. 1 shows a block diagram conceptually illustrating an example of a telecommunications system, in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. In an aspect, the term "component" as used herein may be one of the parts that make up a system, may be hardware or software, and may be divided into other components.

The present aspects generally relate to the harmonization or convergence of different features supported by cellular communications over unlicensed or shared spectrum. These cellular communications may sometimes be referred to as, for example, LTE over unlicensed spectrum, LTE-U, and license-assisted access (LAA). The harmonization or convergence of these features may enable cellular communications that support not only listen before talk (LBT) techniques (e.g., clear channel assessment or CCA) for accessing an unlicensed or shared medium, but may also support the use of both CRS-based and DM-RS-based transmission modes (TMs) within the same transmission (e.g., TM multiplexing).

The use of unlicensed band or spectrum operation opens the opportunity of using larger number of carriers (e.g., component carriers or CCs). Unlicensed band or spectrum may sometimes be referred to as shared band or spectrum. The use of a large number of carriers is in contrast to current carrier aggregation (CA) operations in which the number of CCs support is much smaller, and consequently, may not scale well from the perspective of UE power consumption. To take advantage of the power savings opportunities provided by unlicensed band operation, different modifications to the way cellular communications operate over unlicensed or shared spectrum are described herein. Some of these modifications are intended to, at least in part, minimize or reduce the amount of time a UE needs to monitor a downlink on the many component carriers while there is no downlink transmission.

As described above, current operations may not be optimized for more than a few carriers, and therefore, may not be able to handle the large number of carriers available for unlicensed band or spectrum operation, let alone handle different types of carriers (e.g., carriers over a licensed spectrum or licensed carriers, carriers over an unlicensed spectrum or unlicensed carriers). One area where this may be an issue is with discontinuous reception (DRX) operations. Because licensed operations are deterministic, it is possible to know when information is going to be received and wake up to DRX ON period from a DRX OFF period at the appropriate time. On the other hand, in unlicensed operations there is no guarantee that information is going to be received when waking up from a DRX OFF period. In some instances, it may take some time to get a transmission as the transmitting device may have to gain access to the medium (e.g., LBT) before being able to transmit. Below are provided improved DRX mechanisms to address these and other related issues.

Another aspect described is the use of DL/UL subframe configuration signalling even for UEs not supporting UL and DL subframe type signalling. The use of DL/UL subframe configuration may enable, among other things, support for dynamic number of DL and UL subframes in each transmission burst and Dl subframe type signalling may enable support for both CRS-based and DM-RS-based transmission modes within the same transmission (see e.g., FIG. 5).

Yet another aspect described is to that some of the features being implemented may enable taking advantage of micro-sleep opportunities. Micro-sleep situations may refer to those instances in which a device may be placed in a sleep or similar mode for a short duration of time (different from the longer DRX operations). An example may occur when a grant is transmitted and the physical downlink control channel (PDCCH) is decoded by the middle of the subframe. In such cases, the UE may go to sleep for the remaining of the subframe and current configurations may not allow for operations to take place during the rest of the subframe.

These and other aspects described herein are provided as motivating factors for the harmonization or convergence of different features supported by cellular communications over unlicensed or shared spectrum, including changes to subframe configuration, DRX operations, and channel state information (CSI) feedback.

Aspects of the disclosure are provided in the following description and related drawings directed to specific disclosed aspects. Alternate aspects may be devised without departing from the scope of the disclosure. Additionally, well-known aspects of the disclosure may not be described in detail or may be omitted so as not to obscure more relevant details. Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Referring first to FIG. 1, a diagram illustrates an example of a wireless communications system 100, in accordance with aspects described herein. The wireless communications system 100 includes a plurality of base stations (e.g., eNBs, WLAN access points, or other access points) 105, a number of user equipment (UEs) 115, and a core network 128. One or more UEs 115 may include a unlicensed operations component 130 (see e.g., FIG. 4A) configured to harmonize between CRS and DM-RS based TMs in unlicensed spectrum. Similarly, one or more base stations 105 may include a unlicensed operations component 140 (see e.g., FIG. 4B) configured to harmonize between CRS and DM-RS based TMs in unlicensed spectrum.

Accordingly, for example, the UEs 115 may communicate with one another (e.g., with or without the assistance of a base station 105 to schedule resources) using a direct message-based communication. Some of the base stations 105 may communicate with the UEs 115 under the control of a base station controller (not shown), which may be part of the core network 128 or the certain base stations 105 (e.g., eNBs) in various examples. Base stations 105 may communicate control information and/or user data with the core network 128 through backhaul links 129. In examples, the base stations 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each of communication links 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the UEs 115 via one or more base station antennas. Each of the base stations 105 sites may provide communication coverage for a respective coverage area 110. In some examples, base stations 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include base stations 105 of different types (e.g., macro, micro, and/or pico base stations). The base stations 105 may also utilize different radio technologies, such as cellular and/or WLAN radio access technologies (RAT). The base stations 105 may be associated with the same or different access networks or operator deployments. The coverage areas of different base stations 105, including the coverage areas of the same or different types of base stations 105, utilizing the same or different radio technologies, and/or belonging to the same or different access networks, may overlap.

In LTE/LTE-Advanced (LTE-A), for example, the terms evolved Node B (eNodeB or eNB) may be generally used to describe the base stations 105. The wireless communications system 100 may be a Heterogeneous LTE/LTE-A network in which different types of access points provide coverage for various geographical regions. For example, each base station 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs 115 with service subscriptions with the network provider. A small cell would generally cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells.

The core network 128 may communicate with the eNBs or other base stations 105 via a backhaul links 129 (e.g., S1 interface, etc.). The base stations 105 may also communicate with one another, e.g., directly or indirectly via backhaul links 134 (e.g., X2 interface, etc.) and/or via backhaul links 129 (e.g., through core network 128). The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, a vehicle-based UE, or the like. A UE 115 may be able to communicate with macro eNodeBs, small cell eNodeBs, relays, and the like. A UE 115 may also be able to communicate over different access networks, such as cellular or other WWAN access networks, or WLAN access networks.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. The UEs 115 may be configured to collaboratively communicate with multiple base stations 105 through, for example, Multiple Input Multiple Output (MIMO), carrier aggregation (CA), Coordinated Multi-Point (CoMP), multiple connectivity, or other schemes. MIMO techniques use multiple antennas on the base stations 105 and/or multiple antennas on the UEs 115 to transmit multiple data streams.

Figure 2:
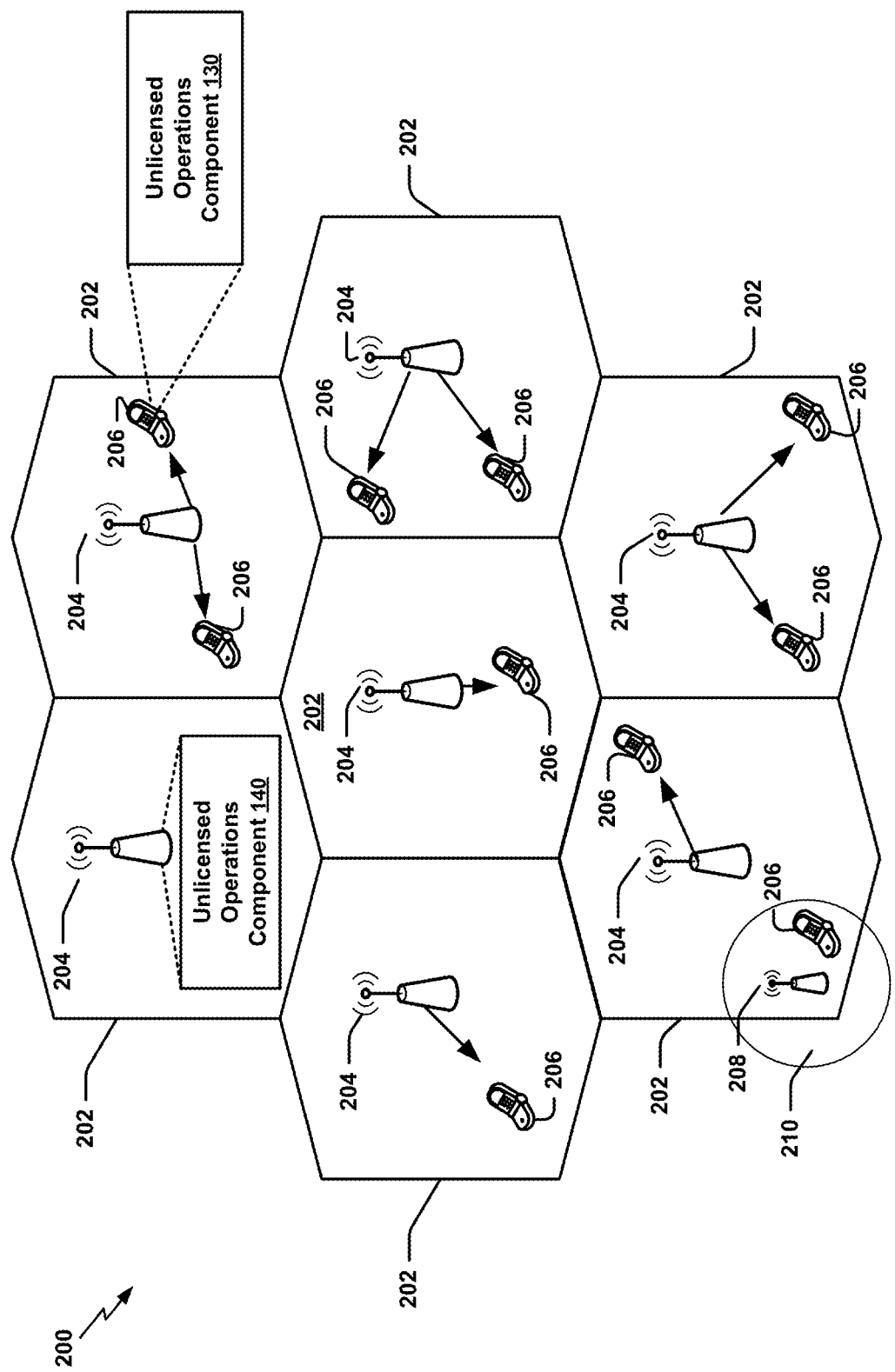
FIG. 2 is a diagram illustrating an example of an access network.

FIG. 2 is a diagram illustrating an example of an access network 200 in an LTE network architecture or similar cellular network architecture. In this example, the access network 200 is divided into a number of cellular regions (cells) 202. One or more lower power class base stations 208 may have cellular regions 210 that overlap with one or more of the cells 202. The lower power class base stations 208 may be a femto cell (e.g., home eNB (HeNB)), pico cell, micro cell, or remote radio head (RRH). The macro base stations 204 are each assigned to a respective cell 202 and are configured to provide an access point to the core network 128 for all the UEs 206 in the cells 202.

In an aspect, one or more UEs 206 may include a unlicensed operations component 130 (see e.g., FIG. 4A) configured to harmonize between CRS and DM-RS based TMs in unlicensed spectrum. Similarly, one or more base stations 204/208 may include a unlicensed operations component 140 (see e.g., FIG. 4B) configured to harmonize between CRS and DM-RS based TMs in unlicensed spectrum. There is no centralized controller in this example of an access network 200, but a centralized controller may be used in alternative configurations. The base stations 204 are responsible for all radio related functions including radio bearer control, admission control, mobility control, scheduling, security, and connectivity to one or more components of core network 128.

The modulation and multiple access scheme employed by the access network 200 may vary depending on the particular telecommunications standard being deployed. In LTE applications, OFDM may be used on the DL and SC-FDMA may be used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The base stations 204 may have multiple antennas supporting MIMO technology. The use of MIMO technology enables the base stations 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the base stations 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
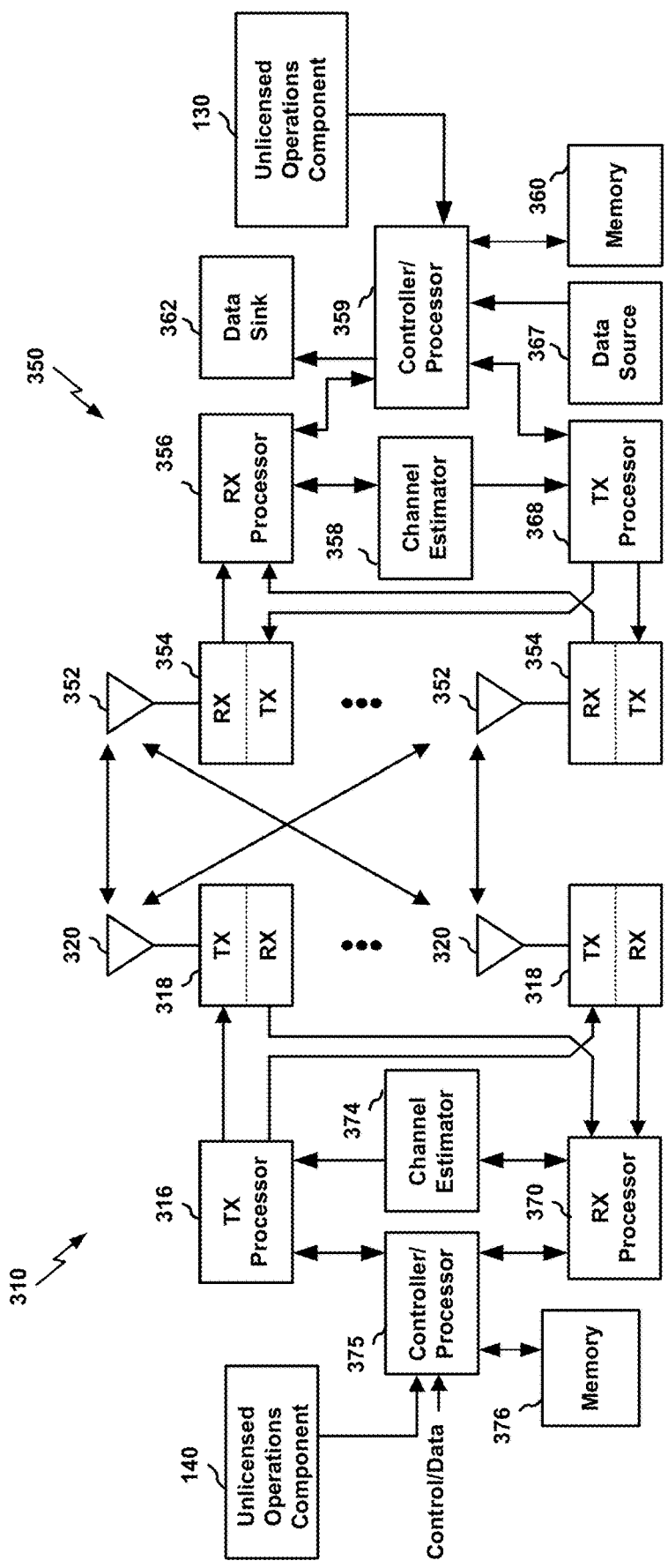
FIG. 3 is a diagram illustrating an example of an evolved Node B and user equipment in an access network.

FIG. 3 is a block diagram of a base station 310 in communication with a UE 350 in an access network. In the DL, upper layer packets from the core network are provided to a controller/processor 375. The controller/processor 375 implements the functionality of the L2 layer. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for HARQ operations, retransmission of lost packets, and signaling to the UE 350.

The transmit (TX) processor 316 implements various signal processing functions for the L1 layer (i.e., physical layer). The signal processing functions includes coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream is then provided to a different antenna 320 via a separate transmitter 318TX. Each transmitter 318TX modulates an RF carrier with a respective spatial stream for transmission. In addition, base station 310 may include a unlicensed operations component 140 (see e.g., FIG. 4B) configured to harmonize between CRS and DM-RS based TMs in unlicensed spectrum. Though unlicensed operations component 140 is shown as coupled to controller/processor 375, it is to be appreciated that unlicensed operations component 140 can also be coupled to other processors (e.g., RX processor 370, TX processor 316, etc.) and/or implemented by the one or more processors 316, 370, 375 to perform actions described herein. Furthermore, for example, unlicensed operations component 140 may be implemented by any one or more of the processors including, but not limited to, processors 316, 370, and/or 375. Similarly, unlicensed operations component 130 may be implemented by any one or more of the processors including, but not limited to, processors 356, 359, and/or 368.

At the UE 350, each receiver 354RX receives a signal through its respective antenna 352. Each receiver 354RX recovers information modulated onto an RF carrier and provides the information to the receive (RX) processor 356. The RX processor 356 implements various signal processing functions of the L1 layer. The RX processor 356 performs spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, is recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359.

The controller/processor 359 implements the L2 layer. The controller/processor can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover upper layer packets from the core network. The upper layer packets are then provided to a data sink 362, which represents all the protocol layers above the L2 layer. Various control signals may also be provided to the data sink 362 for L3 processing. The controller/processor 359 is also responsible for error detection using an acknowledgement (ACK) and/or negative acknowledgement (NACK) protocol to support HARQ operations. In addition, UE 350 may include a unlicensed operations component 130 (see e.g., FIG. 4A) configured to harmonize between CRS and DM-RS based TMs in unlicensed spectrum. Though unlicensed operations component 130 is shown as coupled to controller/processor 359, it is to be appreciated that communicating component 461 can also be coupled to other processors (e.g., RX processor 356, TX processor 368, etc.) and/or implemented by the one or more processors 356, 359, 368 to perform actions described herein.

In the UL, a data source 367 is used to provide upper layer packets to the controller/processor 359. The data source 367 represents all protocol layers above the L2 layer. Similar to the functionality described in connection with the DL transmission by the base station 310, the controller/processor 359 implements the L2 layer for the user plane and the control plane by providing header compression, ciphering, packet segmentation and reordering, and multiplexing between logical and transport channels based on radio resource allocations by the base station 310. The controller/processor 359 is also responsible for HARQ operations, retransmission of lost packets, and signaling to the base station 310.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 are provided to different antenna 352 via separate transmitters 354TX. Each transmitter 354TX modulates an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The RX processor 370 may implement the L1 layer.

The controller/processor 375 implements the L2 layer. The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

Figure 4A:
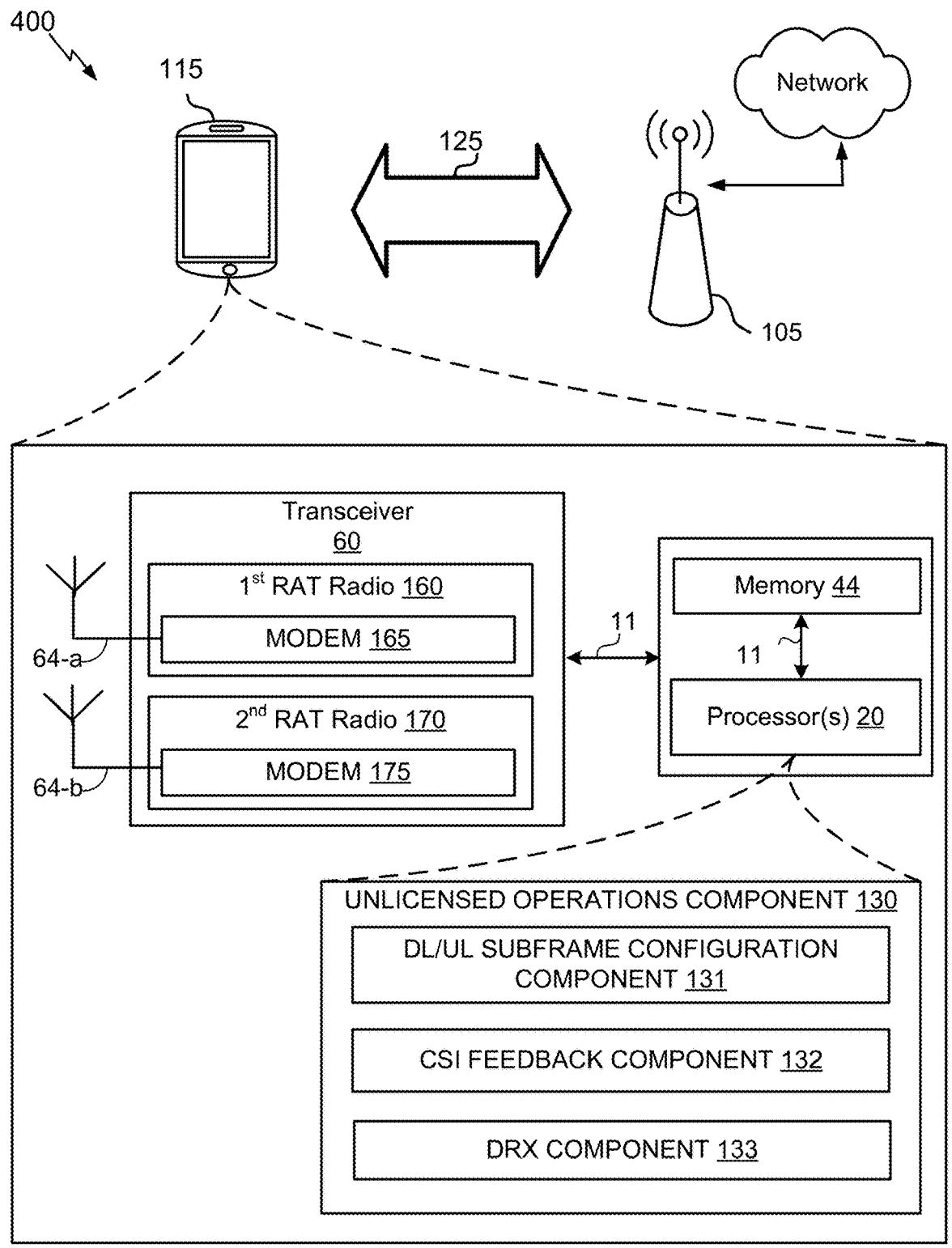
FIGS. 4A and 4B are schematic diagrams of a communication network including an aspect of a UE and network entity in accordance with various aspects of the present disclosure.
Figure 4B:
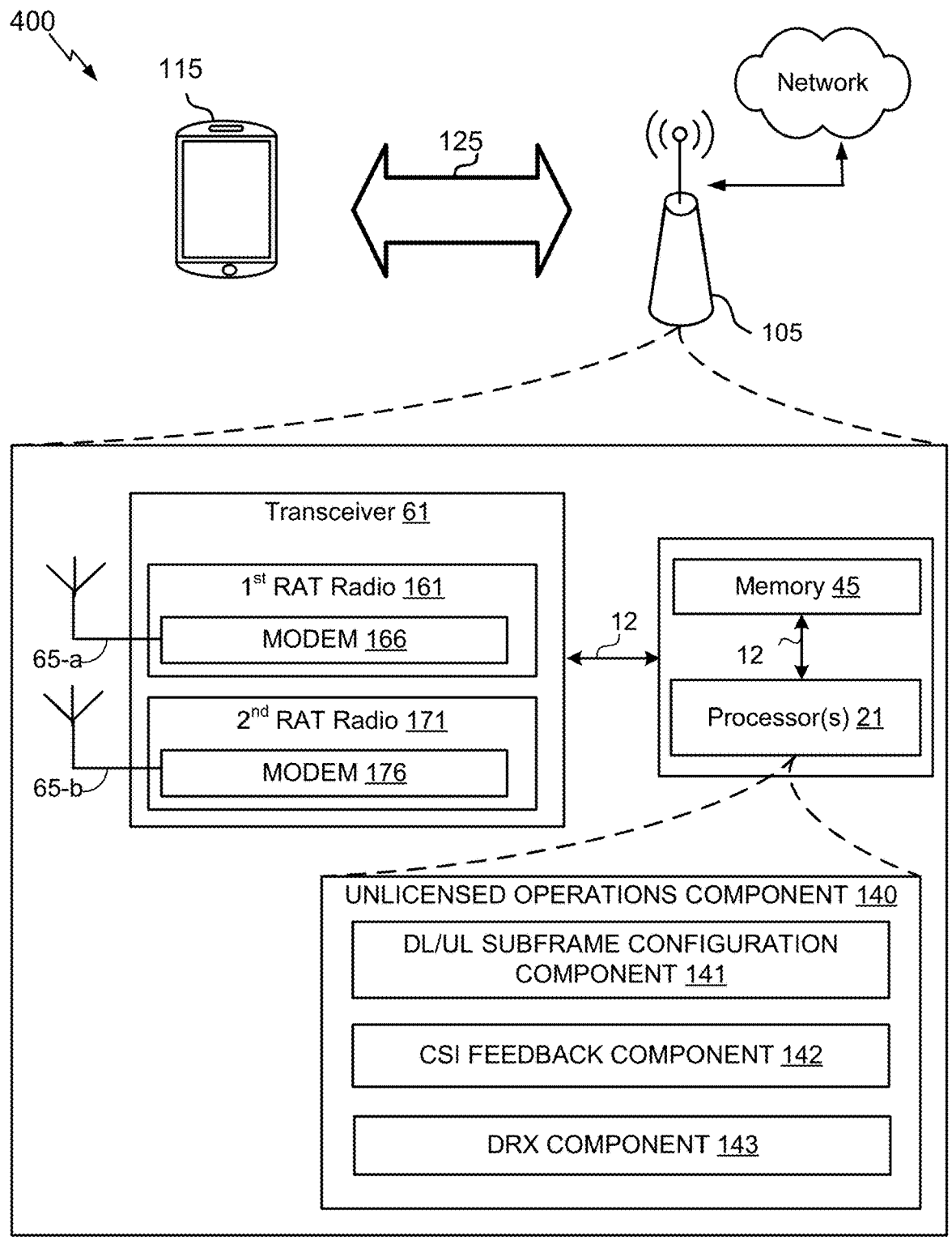

Referring to FIG. 4A and FIG. 4B, in an aspect, a wireless communication system 400 includes at least one user equipment (UE) 115, similar to UE 115 (FIG. 1), UE 206 (FIG. 2), and/or UE 350 (FIG. 3), in communication coverage of at least one network entity 105, similar to base station 105 (FIG. 1), base station 204 (FIG. 2), and/or base station 310 (FIG. 3). The UE 115 may communicate with network via network entity 105. In an example, UE 115 may transmit and/or receive wireless communication to and/or from network entity 105 via one or more communication channels 125, which may include an uplink communication channel (or simply uplink channel) and a downlink communication channel (or simply downlink channel), such as but not limited to an uplink data channel and/or downlink data channel. Such wireless communications may include, but are not limited to, data, audio and/or video information.

Referring to FIG. 4A, in accordance with the present disclosure, UE 115 may include a memory 44, one or more processors 20 and a transceiver 60. The memory, one or more processors 20 and the transceiver 60 may communicate internally via a bus 11. In some examples, the memory 44 and the one or more processors 20 may be part of the same hardware component (e.g., may be part of a same board, module, or integrated circuit). Alternatively, the memory 44 and the one or more processors 20 may be separate components that may act in conjunction with one another. In some aspects, the bus 11 may be a communication system that transfers data between multiple components and subcomponents of the UE 115. In some examples, the one or more processors 20 may include any one or combination of modem processor, baseband processor, digital signal processor and/or transmit processor. Additionally or alternatively, the one or more processors 20 may include an unlicensed operations component 130 for carrying out one or more methods or procedures described herein. The unlicensed operations component 130 may comprise hardware, firmware, and/or software and may be configured to execute code or perform instructions stored in a memory (e.g., a computer-readable storage medium).

In some examples, the UE 115 may include the memory 44, such as for storing data used herein and/or local versions of applications associated with unlicensed operations component 130 and/or one or more of its subcomponents being executed by the one or more processors 20. Memory 44 can include any type of computer-readable medium usable by a computer or processor 20, such as random access memory (RAM), read only memory (ROM), tapes, magnetic discs, optical discs, volatile memory, non-volatile memory, and any combination thereof. In an aspect, for example, memory 44 may be a computer-readable storage medium (e.g., a non-transitory medium) that stores one or more computer-executable codes defining unlicensed operations component 130 and/or one or more of its subcomponents, and/or data associated therewith, when UE 115 is operating processor 20 to execute unlicensed operations component 130 and/or one or more of its subcomponents. In some examples, the UE 115 may further include a transceiver 60 for transmitting and/or receiving one or more data and control signals to/from the network via network entity 105 or to the network entity 105 for its use. The transceiver 60 may comprise hardware, firmware, and/or software and may be configured to execute code or perform instructions stored in a memory (e.g., a computer-readable storage medium). The transceiver 60 may include a $1^{st}$ RAT radio 160 (e.g., Wi-Fi radio) comprising a modem 165, and a $2^{nd}$ RAT radio 170 (e.g., LTE radio) comprising a modem 175. The $1^{st}$ RAT radio 160 and $2^{nd}$ RAT radio 170 may utilize one or more antennas 64 for transmitting signals to and receiving signals from the network entity 105. In an example, 1st RAT radio 160 may be associated with a wireless local area network (WLAN) and 2nd RAT radio 170 may be associated with a wireless wide area network (WWAN) over unlicensed spectrum.

When the UE 115 (or any other devices in the system 100) uses a first RAT to communicate on a given resource, this communication may be subjected to interference from nearby devices that use a second RAT to communicate on that resource. For example, communication by the network entity 105 via LTE using second RAT radio 170 on a particular unlicensed radio frequency (RF) band may be subject to interference from Wi-Fi devices operating on that band. For convenience, LTE on an unlicensed RF band may be referred to herein as LTE/LTE Advanced in unlicensed spectrum, or simply LTE in the surrounding context. Moreover, LTE operating over an unlicensed spectrum may refer to the use or modification of LTE to operate in a contention-based communication system that uses a shared medium.

When network entity 105 sends downlink transmissions to UE 115, assigned resources on the downlink frequency band are utilized. For example, the network entity 105 operating in an unlicensed or shared RF band may be assigned an interlace of radio bearers (RBs) in which downlink data transmissions may be sent. In order to avoid collisions with other network entities in a contention based downlink channel, the network entity 105 may send a preamble.

In some systems, LTE in unlicensed spectrum may be employed in a standalone configuration, with all carriers operating exclusively in an unlicensed portion of the wireless spectrum (e.g., LTE Standalone). In other systems, LTE in unlicensed spectrum may be employed in a manner that is supplemental to licensed band operation by providing one or more unlicensed carriers operating in the unlicensed portion of the wireless spectrum in conjunction with an anchor licensed carrier operating in the licensed portion of the wireless spectrum (e.g., LTE Supplemental DownLink (SDL)). In either case, carrier aggregation may be employed to manage the different component carriers, with one carrier serving as the Primary Cell (PCell) for the corresponding UE (e.g., an anchor licensed carrier in LTE SDL or a designated one of the unlicensed carriers in LTE Standalone) and the remaining carriers serving as respective Secondary Cells (SCells). In this way, the PCell may provide an FDD paired downlink and uplink (licensed or unlicensed), and each SCell may provide additional downlink capacity as desired.

In general, LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

LTE may also use carrier aggregation. UEs (e.g., LTE-Advanced enabled UEs) may use spectrum of up to 20 MHz bandwidths allocated in a carrier aggregation of up to a total of 100 MHz (5 component carriers) used for transmission and reception. For the LTE-Advanced enabled wireless communication systems, two types of carrier aggregation (CA) methods have been proposed, continuous CA and non-continuous CA. Continuous CA occurs when multiple available component carriers are adjacent to each other. On the other hand, non-continuous CA occurs when multiple non-adjacent available component carriers are separated along the frequency band. Both non-continuous and continuous CA may aggregate multiple component carriers to serve a single unit of LTE-Advanced UEs.

In a blended radio environment such as system 400, different RATs may make use of different channels at different times. Because different RATs are sharing the spectrum and operating partly independently of others, access to one channel may not imply access to another channel. Accordingly, a device capable of transmitting using multiple channels may need to determine whether each channel is available before transmitting. In order to increase bandwidth and throughput, it may be beneficial in some situations to wait for an additional channel to become available rather than transmitting using currently available channel(s).

Similarly, with regard to FIG. 4B, network entity 105 may include a memory 45, one or more processors 21 and a transceiver 61. Memory 45, one or more processors 21 and a transceiver 61 may operate in the same and/or similar manner to memory 44, one or more processors 20 and a transceiver 60 of UE 115 described in FIG. 4A. Furthermore, memory 45, one or more processors 21 and a transceiver 61 may operate the same and/or similar components including, but not limited to a $1^{st}$ RAT radio 161 with modem 166, a $2^{nd}$ RAT radio 171 with modem 176, and antennas 65. Moreover, memory 45, one or more processors 21 and the transceiver 61 may communicate internally via a bus 12.

Referring back to FIG. 4A, the unlicensed operations component 130 may be configured to handle signaling between the UE 115 and the network entity 105. In an aspect, the unlicensed operations component 130 may include a DL/UL subframe configuration component 131 configured to perform various operations, functions, and/or features described herein with respect to, for example, modified DL/UL subframe configuration signaling. For example, DL/UL subframe configuration component 131 may be configured to perform aspects described in connection with FIGS. 6A and 6B.

In another aspect, the unlicensed operations component 130 may include a CSI feedback component 132 configured to perform various operations, functions, and/or features described herein with respect to, for example, aperiodic CSI feedback. For example, CSI feedback component 132 may be configured to perform aspects described in connection with FIGS. 7A and 7B.

In another aspect, the unlicensed operations component 130 may include a DRX component 133 configured to perform various operations, functions, and/or features described herein with respect to, for example, modified DRX operations to wake up a UE from a DRX OFF period to handle unlicensed carriers. For example, DRX component 133 may be configured to perform aspects described in connection with FIGS. 9A and 9B.

Referring to FIG. 4B, additionally or alternatively, the one or more processors 21 may include an unlicensed operations component 140 for carrying out one or more methods or procedures described herein. The unlicensed operations component 140 may comprise hardware, firmware, and/or software and may be configured to execute code or perform instructions stored in a memory (e.g., a computer-readable storage medium). The unlicensed operations component 140 may be configured to handle signaling between the UE 115 and the network entity 105. In an aspect, the unlicensed operations component 140 may include a DL/UL subframe configuration component 141 configured to perform various operations, functions, and/or features described herein with respect to, for example, modified DL/UL subframe configuration signaling. For example, DL/UL subframe configuration component 141 may be configured to perform aspects described in connection with FIGS. 6A and 6B.

In another aspect, the unlicensed operations component 140 may include a CSI feedback component 142 configured to perform various operations, functions, and/or features described herein with respect to, for example, aperiodic CSI feedback. For example, CSI feedback component 142 may be configured to perform aspects described in connection with FIGS. 7A and 7B.

In another aspect, the unlicensed operations component 140 may include a DRX component 143 configured to perform various operations, functions, and/or features described herein with respect to, for example, modified DRX operations to wake up a UE from a DRX OFF period to handle unlicensed carriers. For example, DRX component 143 may be configured to perform aspects described in connection with FIGS. 9A and 9B.

Additionally, as used herein, the one or more wireless nodes, including, but not limited to, network entity 105 of wireless communication system 400, may include one or more of any type of network component, such as an network entity, including a base station or node B, a relay, a peer-to-peer device, an authentication, authorization and accounting (AAA) server, a mobile switching center (MSC), a radio network controller (RNC), etc. In a further aspect, the one or more wireless serving nodes of wireless communication system 400 may include one or more small cell base stations, such as, but not limited to a femtocell, picocell, microcell, or any other base station having a relatively small transmit power or relatively small coverage area as compared to a macro base station.

Figure 5:
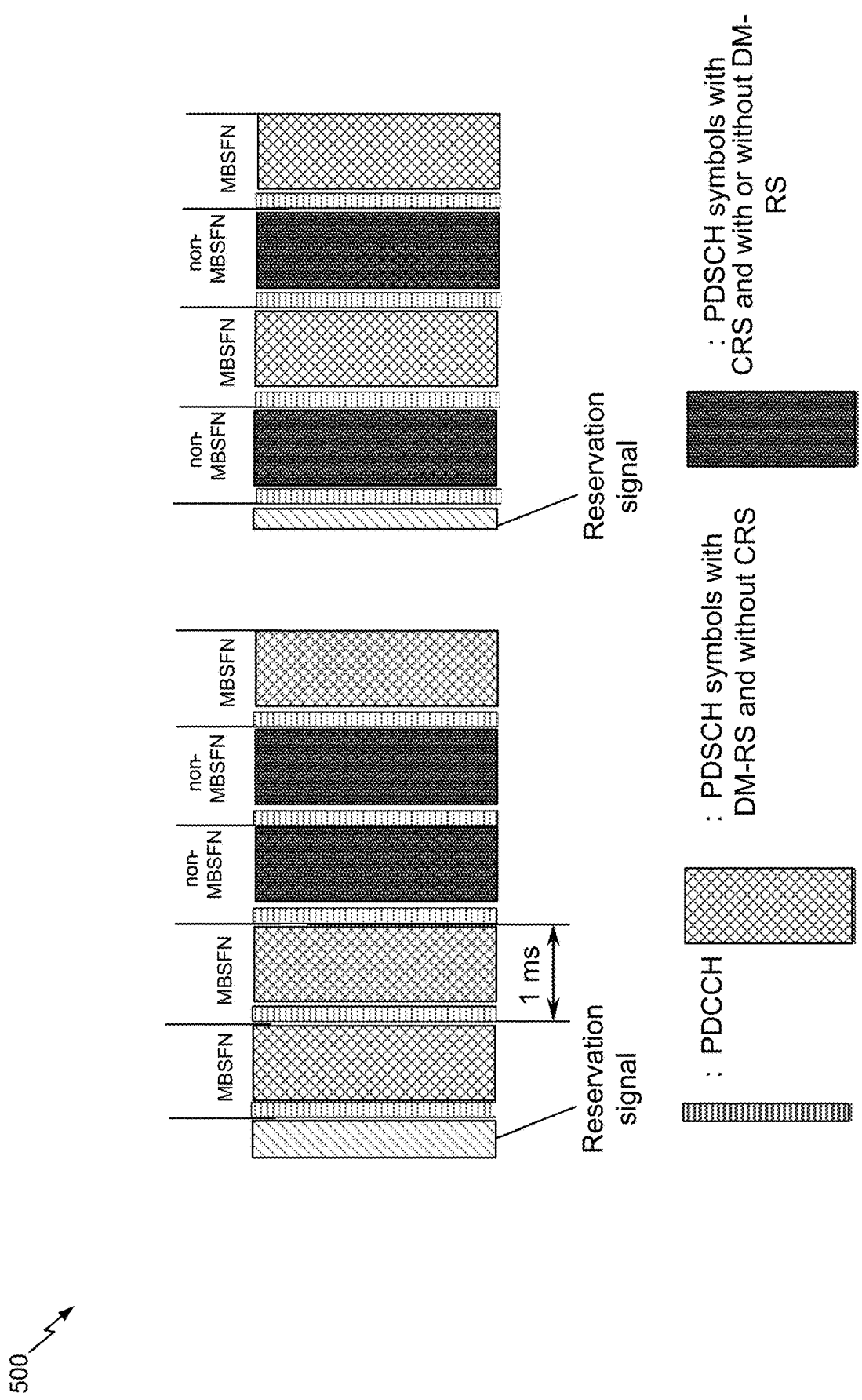
FIG. 5 is a diagram illustrating an example of downlink transmission bursts with multiplexed MBSFN and non-MBSFN subframes in accordance with various aspects of the present disclosure.

With respect to the use of modified DL/UL subframe configurations described above in connection with the DL/UL subframe configuration components 131 and 141, part of the motivation for harmonization or convergence of different features supported by cellular communications over unlicensed or shared spectrum is to enable the support of downlink transmission for both CRS-based transmission modes and DM-RS-based transmission modes. One aspect is to multiplex CRS-based transmission modes and DM-RS transmission modes by supporting multicast-broadcast single-frequency network (MBSFN) subframes and non-MBSFN subframes within the same transmission burst since MBSFN subframes can support DM-RS-based transmission modes and non-MBSFN subframes can support CRS-based transmission modes as well as DM-RS-based transmission modes. FIG. 5 is a diagram illustrating an example of downlink transmission bursts 500 with multiplexed MBSFN and non-MBSFN subframes in accordance with various aspects of the present disclosure. It is then up to the UE (e.g., UE 115) receiving the subframes to determine whether the subframe is an MBSFN subframe or a non-MBSFN subframe.

For each downlink subframe received by the UE there is a CRS in symbol #0. There may or may not be PDCCH in symbol #0 (in the example shown in FIG. 5 there is PDCCH in symbol #0). The UE can first detect the presence of CRS in symbol #0 to determine whether the downlink subframe received is a valid downlink subframe. Therefore, the UE determines whether the current downlink subframe is valid based on information provided in the subframe. In contrast to a per-subframe determination, other approaches rely on information provided before the downlink transmission burst to identify the validity of the downlink subframe.

Once a downlink subframe is determined to be valid, the UE may then determine the type of subframe, that is, whether the downlink subframe is an MBSFN subframe or a non-MBSFN subframe. One way to do so is by detecting CRS. For example, for MBSFN subframes, CRS is located in symbol #0 and for non-MBSFN subframes, CRS is located in symbols #0, #4, #7, and #11. Symbol #0 provides the phase reference to demodulate PDCCH in both types of subframes. By determining the type of subframe, it is possible to decode PDCCH very fast (before the end of the subframe) and go into a micro-sleep mode for the rest of the subframe if there is no data to process.

Another feature that is provided by this modified DL/UL subframe configuration is that the configuration is not static and a ratio of MBSFN subframes of the transmission burst can range from 0% to 100% (i.e., need not be limited to up to 60%). By proposing a dynamic configuration, it is possible for every downlink subframe to be an MBSFN subframe (ratio=100%). As such, if only DM-RS-based transmission mode is used, then every downlink subframe in a downlink transmission burst (e.g., transmission burst 500) is an MBSFN subframe.

In this dynamic configuration, the UE is not told ahead of time what is the configuration of a specific subframe. Instead, the UE determines the configuration dynamically by checking for the presence of CRS as described above. For example, the UE first checks for the presence of CRS in symbol #0 to determine whether the downlink subframe is a valid subframe. Then, the UE determines whether the downlink subframe is an MBSFN subframe or a non-MBSFN subframe. It can do so in two ways. One approach is for the network (e.g., network entity 105) to signal to the UE whether a respective or current downlink subframe is an MBSFN subframe or a non-MBSFN subframe. Another approach is for the UE to blindly detect whether a respective or current downlink subframe is an MBSFN subframe or a non-MBSFN subframe by checking for the presence of CRS in symbol #4. If CRS is not present in symbol #4, then the downlink subframe is an MBSFN subframe, if CRS is present in symbol #4, then the downlink subframe is a non-MBSFN subframe. In a related aspect, when micro-sleep opportunities are not that relevant, it is possible to have CRS present in symbol #0, and perhaps some other control signaling, and demodulation can be based on enhanced PDCCH (EPDCCH).

Signaling the type of subframe to the UE can be done in different ways. For example, one approach may be to encode information jointly with physical control format indicator channel (PCFICH). PCFICH typically carries two bits to provide the UE with information about the control region (e.g., whether it is one, two, or three symbols long). In this approach, one of the bits may still be used for indicating whether the control region is one or two symbols long, and at least the other bit may be used to indicate whether the subframe is an MBSFN subframe or a non-MBSFN subframe. By using signaling in this way, the UE need not rely on CRS to determine the subframe type.

In another signaling approach, PCFICH is not changed and instead an MBSFN subframe or a non-MBSFN subframe (PHICH) is used. Since for LAA or LTE over unlicensed spectrum the UL HARQ is asynchronous, it is not necessary to use PHICH to indicate whether the uplink transmission was completed. Therefore, it may be possible to use PHICH to transmit at least one bit of information to indicate whether the subframe is an MBSFN subframe or a non-MBSFN subframe.

In yet another signaling approach, layer 1 signaling (e.g., PDCCH transmitted on a PCell) may be used to provide MBSFN/on-MBSFN configuration information for all of the carriers on the eNB (e.g., network entity 105) side. The UE is assigned at least one bit (e.g., one or two bits) to monitor to determine the configuration of the downlink subframe. If the information cannot be sent for each subframe, it may be possible to use the previous approach and provide configuration information ahead of the subframe being transmitted.

As indicated above, one of the aspects being presented is the signaling of DL/UL subframe configuration at every subframe. In previous approaches, the configuration information was signaled at the beginning of a downlink transmission burst. The issue that may result is that when waking up from DRX (e.g., when waking up from a DRX OFF period) in the middle of the burst, the UE would not have configuration information available to process the information in the remaining portion of the burst and would have to wait until the next downlink transmission burst, somewhat defeating the purpose of the DRX operation. By sending the DL/UL subframe configuration information at every subframe there is no longer a problem with waking up in the middle of a burst.

In an example of the type of DL/UL subframe configuration signaling, for a configuration that is identified to be a six (6) downlink subframes and four (4) uplink subframes, a network entity may signal in the first subframe that there are six downlink subframes and four uplink subframes in the configuration. The network entity may signal in the second subframe that there are five (5) downlink subframes and four uplink subframes remaining in the configuration. The network entity may further signal in the third subframe that there are four downlink subframes and four uplink subframes remaining in the configuration. The network entity may continue this type of signaling until the last uplink subframe is signaled in the last subframe. This type of signaling provides a self-consistent form of signaling between the network entity (e.g., eNB) and the UE. Moreover, even if the UE wakes up from DRX in the middle of a transmission burst, the UE can still process the rest of the transmission by checking, for each of the remaining subframes (e.g., the UE can check whether a downlink subframe is valid by checking for CRS in symbol #0 and then decoding the rest of the subframe). Signaling of the DL/UL subframe configuration may occur by transmitting the information using PFFICH, PHICH resources, or PDCCH common search space (CSS).

Another benefit or useful aspect of the signaling of DL/UL subframe configuration at every subframe as described herein is that the network entity (e.g., eNB) can change the configuration even after the start of the transmission burst. For example, if after an initial configuration of six (6) downlink subframes and four (4) uplink subframes the network entity determines to include two additional downlink subframes it may do so by signaling a configuration of six (6) downlink subframes and four (4) uplink subframes after the first two downlink subframes have taken place, effectively providing a configuration of eight (8) downlink subframes and four (4) uplink subframes. There are limitations as to the changes that the network entity may make. For example, the changes may not be such as to exceed the maximum channel occupancy. Also, if the network entity has already sent an uplink grant, the change may not be such as to render the uplink grant ineffective, that is, the network entity may not extend the downlink subframes beyond any uplink grant already provided.

Yet another benefit or useful aspect of the signaling of DL/UL subframe configuration at every subframe as described herein is that it may operate in a manner similar to a Wi-Fi channel reservation signal (e.g., Wi-Fi network vector allocation or NAV). In Wi-Fi, the medium access control (MAC) header of each packet may include a reservation time that basically that indicates to any device decoding the packet the amount of time the channel is going to be occupied so no transmissions take place during that time. In one example, it may be indicated that three (3) milliseconds of time will be reserved in the channel, two (2) milliseconds for downlink transmissions and one (1) millisecond for uplink transmissions. During this time, other devices are not to perform any transmissions. As such, the DL/UL subframe configuration may act like an LTE unlicensed reservation signal. Any node or device that receives this signal may know for how many downlink subframes and uplink subframes has the channel been reserved and may wait to transmit until not interfering with any of the uplink transmissions.

One additional aspect of the signaling of DL/UL subframe configuration at every subframe as described herein is that if the configuration for one subframe is missed for some reason (e.g., problem to properly decode the configuration information), it may be fine to proceed because if the subframe is a valid subframe (e.g., CRS detected in symbol #0), then it may be possible to use the configuration in a next subframe to decode the current subframe.

Figure 6A:
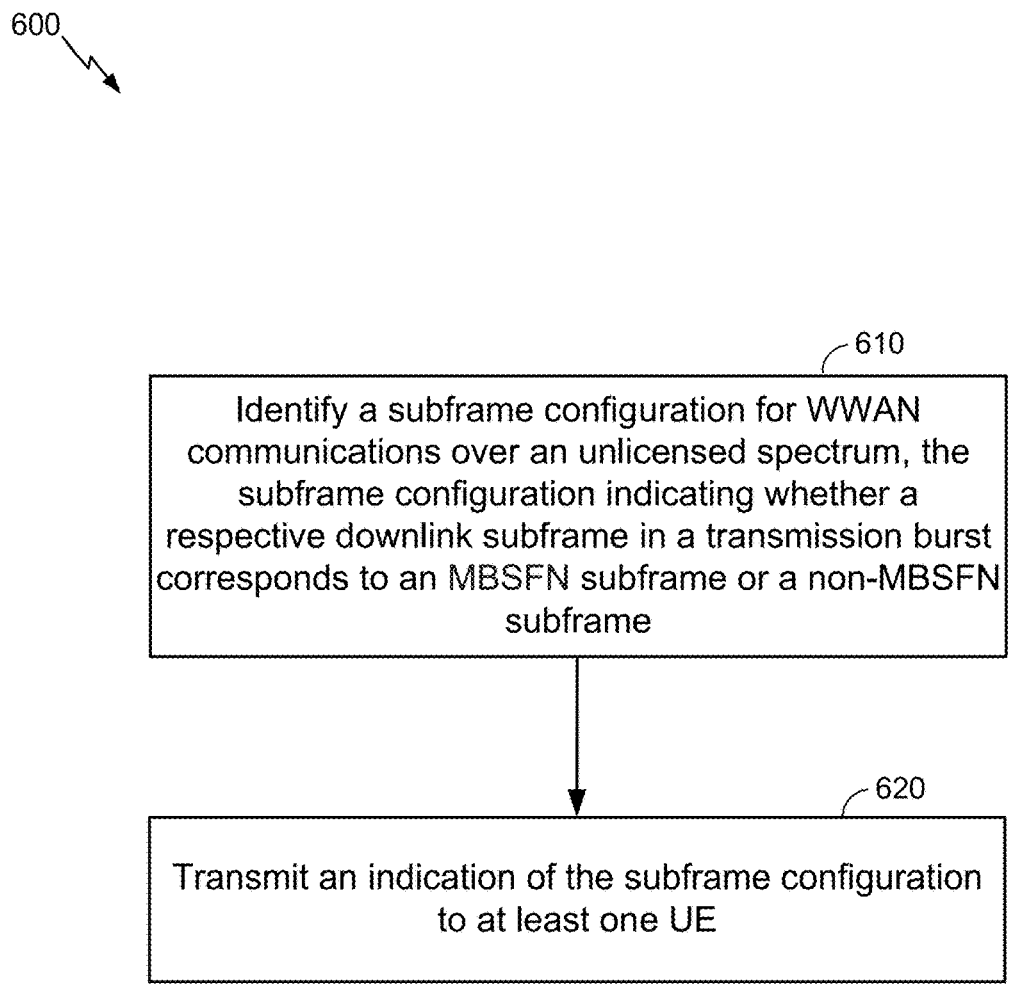
FIGS. 6A and 6B are flow diagrams illustrating examples of methods related to signaling of a DL/UL subframe configuration in each subframe in accordance with various aspects of the present disclosure.
Figure 6B:
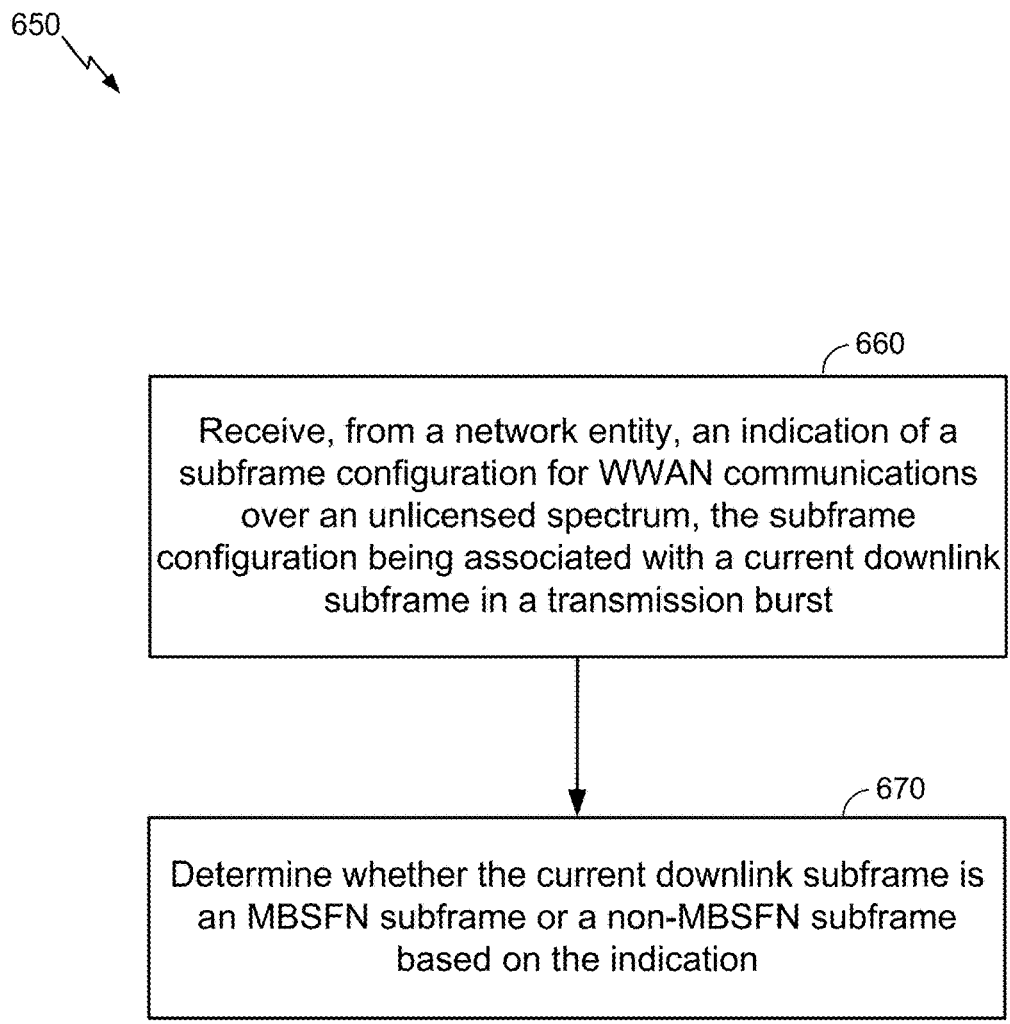

FIG. 6A and FIG. 6B are flow diagrams illustrating examples of methods related to signaling of a DL/UL subframe configuration in each subframe in accordance with various aspects of the present disclosure. Although the operations described below are presented in a particular order and/or as being performed by an example component, it should be understood that the ordering of the actions and the components performing the actions may be varied, depending on the implementation. Also, although the unlicensed operations components 130 and 140 are illustrated as having a number of subcomponents, it should be understood that one or more of the illustrated subcomponents may be separate from, but in communication with, the unlicensed operations components 130 and 140, and/or each other. Moreover, it should be understood that any of actions or components described below with respect to the components 130 and 140 and/or their subcomponents may be performed by a specially-programmed processor, a processor executing specially-programmed software or computer-readable media, or by any other combination of a hardware component and/or a software component specially configured for performing the described actions or components.

Referring to FIG. 6A, in an aspect, at block 610, method 600 includes identifying a subframe configuration for WWAN communications over an unlicensed spectrum, the subframe configuration indicating whether a respective downlink subframe in a transmission burst corresponds to an MBSFN subframe or a non-MBSFN subframe. In an aspect, for example, network entity 105 (e.g., eNB), processor(s) 21, and/or memory 45 may execute unlicensed operations component 140 and/or DL/UL subframe configuration component 141 to identify the subframe configuration. In a further aspect, processing system 1214 (FIG. 12), processor 1204, and/or memory 1206 may execute unlicensed operations component 1120 to identify the subframe configuration.

At block 620, method 600 includes transmitting an indication of the subframe configuration to at least one UE. In an aspect, for example, network entity 105, processor(s) 21, and/or memory 45 may execute unlicensed operations component 140, DL/UL subframe configuration component 141, and/or transceiver 61 to transmit the indication of the subframe configuration. In a further aspect, processing system 1214 (FIG. 12), processor 1204, and/or memory 1206 may execute transmission component 1112 to transmit the indication of the subframe configuration.

Referring to FIG. 6B, in an aspect, at block 660, method 650 includes receiving, from a network entity, an indication of a subframe configuration for WWAN communications over an unlicensed spectrum, the subframe configuration being associated with a current downlink subframe in a transmission burst. In an aspect, for example, UE 115, processor(s) 20, and/or memory 44 may execute unlicensed operations component 130, DL/UL subframe configuration component 131, and/or transceiver 60 to receive the indication. In a further aspect, processing system 1414 (FIG. 14), processor 1404, and/or memory 1406 may execute reception component 1304 to receive the indication.

At block 670, method 650 includes determining whether the current downlink subframe is an MBSFN subframe or a non-MBSFN subframe based on the indication. In an aspect, for example, UE 115, processor(s) 20, and/or memory 44 may execute unlicensed operations component 130 and/or DL/UL subframe configuration component 131 to determine the subframe type. In a further aspect, processing system 1414 (FIG. 14), processor 1404, and/or memory 1406 may execute unlicensed operations component 1320 to determine the subframe type.

In addition to the modifications of the DL/UL subframe configuration discussed above, another aspect related to the harmonization or convergence of different features supported by cellular communications over unlicensed or shared spectrum may include the support of both periodic and aperiodic channel state information (CSI) feedback. In this approach, resources such as CSI reference signal (CSI-RS) and CSI interference measurement (CSI-IM) may be configured aperiodically and reporting of CSI feedback may also be provided aperiodically. In one example, resources may be provided in a subframe and an indication is also provided in the subframe to a subset of the UEs (from which CSI feedback is desirable) that the resources are available and to provide feedback (e.g., reporting) based on those resources. For those UEs not in the subset but that may have an uplink grant to provide CSI feedback, the resources may also be indicated. It may also be possible to indicate the resources one subframe before the resources are provided. In some instances, PDCCH may be used to indicate the resources being available in a subframe. The UE receiving an indication of the availability of the resources may perform a check of the subframe to determine whether the subframe is a valid downlink subframe (e.g., check for CRS on symbol #0) before performing any CSI measurements based on the resources indicated.

Figure 7A:
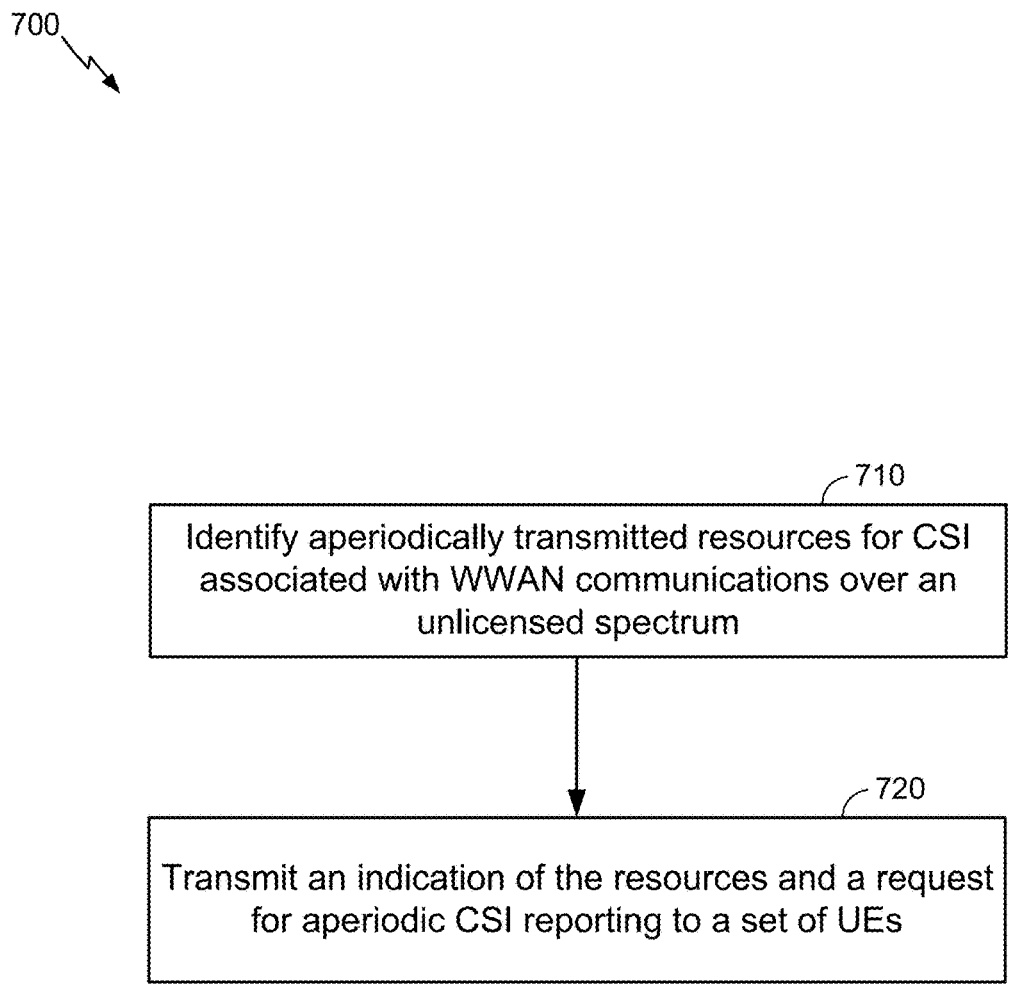
FIGS. 7A and 7B are flow diagrams illustrating examples of methods related to signaling for aperiodic CSI feedback in accordance with various aspects of the present disclosure.
Figure 7B:
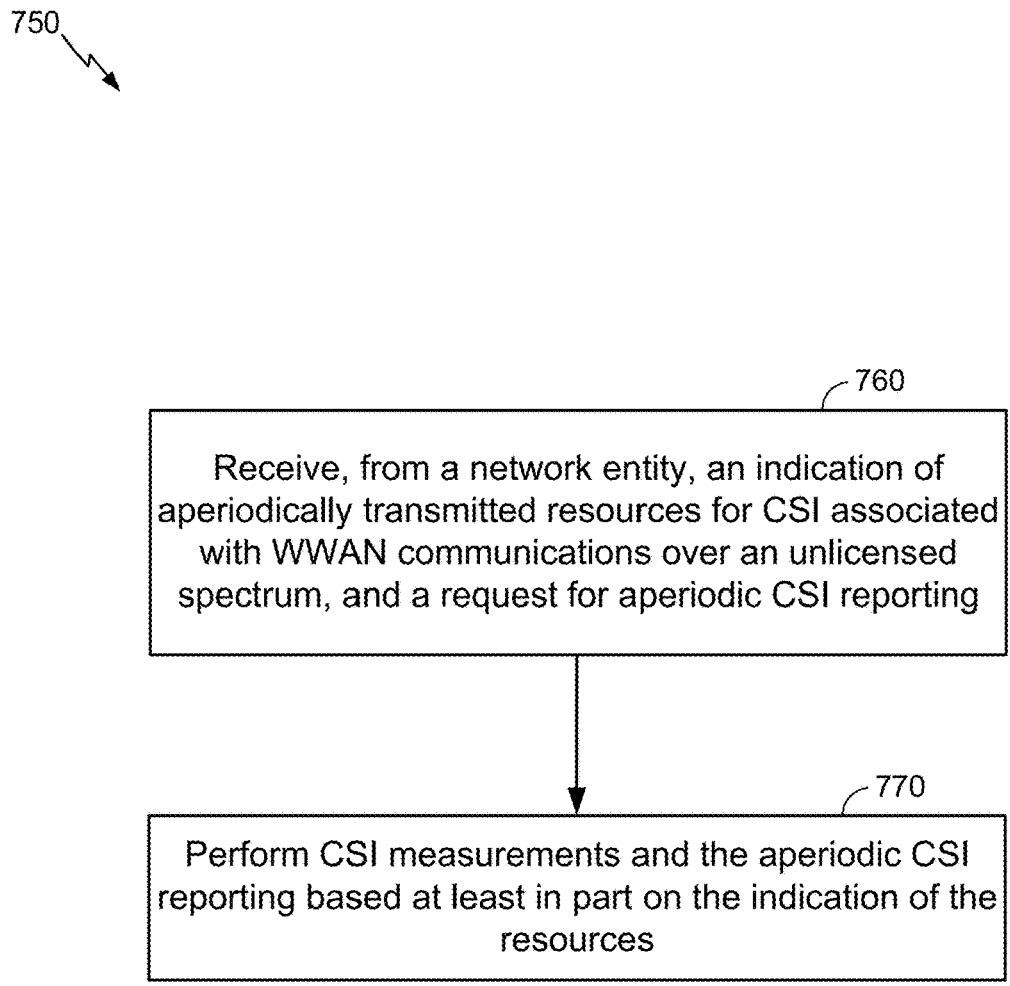

FIG. 7A and FIG. 7B are flow diagrams illustrating examples of methods related to signaling for aperiodic CSI feedback in accordance with various aspects of the present disclosure.

Referring to FIG. 7A, in an aspect, at block 710, method 700 includes identifying aperiodically transmitted resources for CSI associated with WWAN communications over an unlicensed spectrum. In an aspect, for example, network entity 105, processor(s) 21, and/or memory 45 may execute unlicensed operations component 140 and/or CSI feedback component 142 to identify the resources. In a further aspect, processing system 1214 (FIG. 12), processor 1204, and/or memory 1206 may execute unlicensed operations component 1120 to identify the resources.

At block 720, method 700 includes transmitting an indication of the resources and a request for aperiodic CSI reporting to a set of UE. In an aspect, for example, network entity 105, processor(s) 21, and/or memory 45 may execute unlicensed operations component 140, CSI feedback component 142, and/or transceiver 61 to transmit the indication of the resources. In a further aspect, processing system 1214 (FIG. 12), processor 1204, and/or memory 1206 may execute unlicensed operations component 1120 and/or transmission component 1112 to transmit the indication of the resources.

Referring to FIG. 7B, in an aspect, at block 760, method 750 includes receiving, from a network entity, an indication of aperiodically transmitted resources for CSI associated with WWAN communications over an unlicensed spectrum, and a request for aperiodic CSI reporting. In an aspect, for example, UE 115, processor(s) 20, and/or memory 44 may execute unlicensed operations component 130, CSI feedback component 132, and/or transceiver 60 to receive the indication. In a further aspect, processing system 1414 (FIG. 14), processor 1404, and/or memory 1406 may execute reception component 1304 to receive the indication.

At block 770, method 750 includes performing CSI measurements and the aperiodic CSI reporting based at least in part on the indication of the resources. In an aspect, for example, UE 115, processor(s) 20, and/or memory 44 may execute unlicensed operations component 130, CSI feedback component 132, and/or transceiver 60 to perform the measurements and the aperiodic CSI reporting. In a further aspect, processing system 1414 (FIG. 14), processor 1404, and/or memory 1406 may execute unlicensed operations component 1320 to perform the measurements and the aperiodic CSI reporting.

Figure 8:
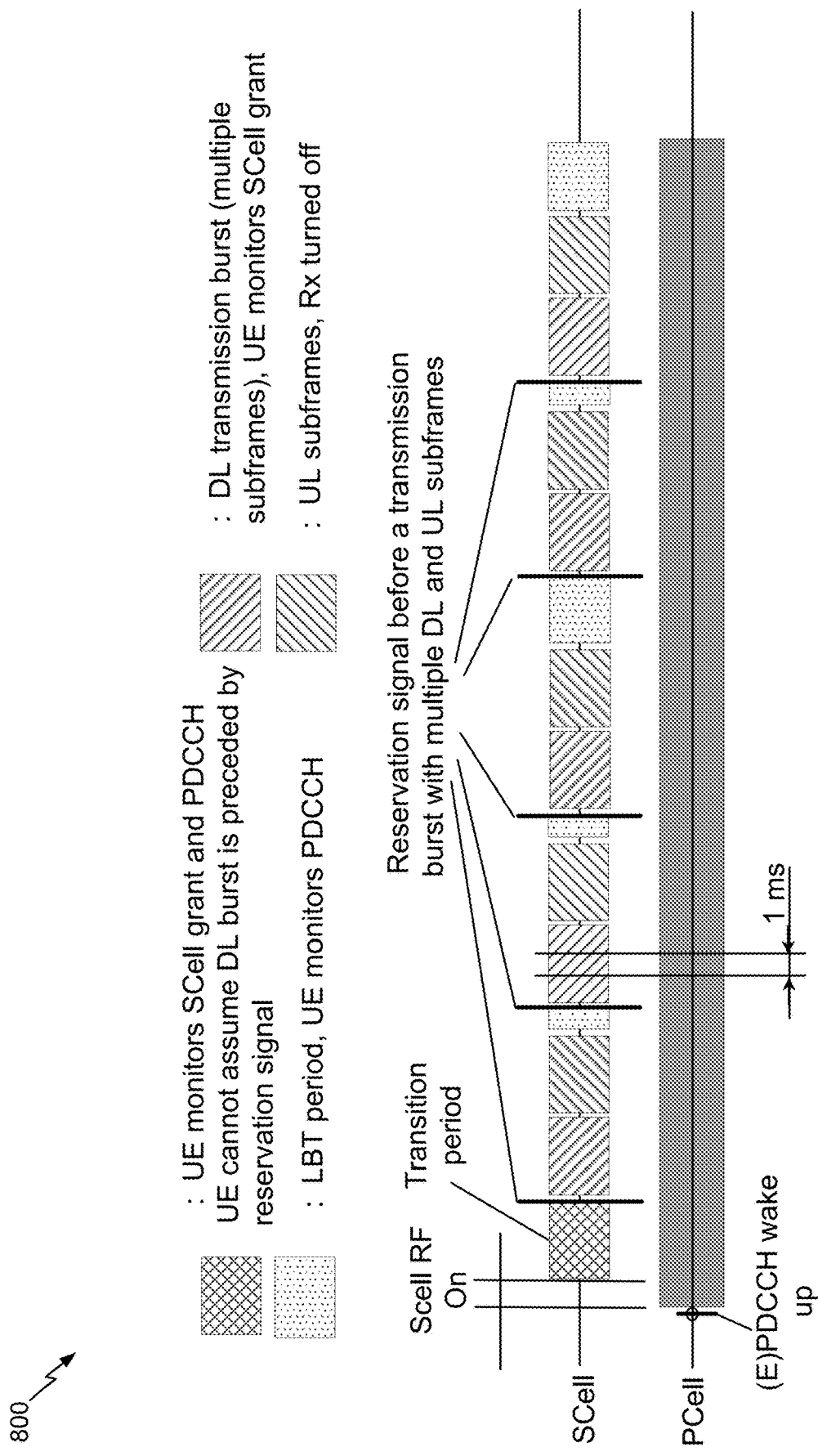
FIG. 8 is a diagram illustrating an example of DRX wake up operations for licensed and unlicensed carriers in accordance with various aspects of the present disclosure.

In addition to the modifications of the DL/UL subframe configuration and CSI feedback operations discussed above, another aspect related to the harmonization or convergence of different features supported by cellular communications over unlicensed or shared spectrum may include modification to DRX operations to support license and unlicensed carriers. FIG. 8 is a diagram 800 illustrating an example of DRX wake up operations for licensed and unlicensed carriers in accordance with various aspects of the present disclosure. While FIG. 8 describes the use of a reservation signal at the beginning of a transmission burst, the use of configuration signaling at every subframe as discussed above may also be applicable to the DRX procedure illustrated in FIG. 8.

As indicated above, DRX procedures were not initially designed to handle the large number of carriers and also the use of different carriers such as carriers over a licensed spectrum (e.g., licensed carriers) and carriers over an unlicensed spectrum (e.g., unlicensed carriers). For licensed carriers, for example, a UE may be able to wake up from DRX (e.g., wake up from a DRX OFF period) and be able to process data because it is likely to receive data over the license carrier after waking up. For unlicensed carriers the UE may wake up from DRX and there is no data to be processed since some other device may be occupying the channel. In such cases, the UE may make a measurement of some kind and then go back to sleep.

To address these issues, the DRX procedure may be modified such that the UE wakes up from DRX for one or more licensed carriers (e.g., a subset of licensed carriers). When the UE wakes up, it may receive an indication (e.g., a grant) from the network entity (e.g., a PCell) over a licensed carrier to wake up for the unlicensed carriers. The indication can be an explicit indication (e.g., instruction to wake up) or an implicit indication with a downlink grant receiver. The UE may then wake up for the unlicensed carriers to receive the appropriate data for the unlicensed carriers. Waking up for one or another type of carrier may involve enabling or operating the appropriate hardware, software, and/or firmware to enable handling data being provided over the type of carrier. In a way, this modified DRX procedure may be referred to a licensed-triggered unlicensed DRX. That is, the DRX wake up for the unlicensed carriers is trigger by a licensed carrier (e.g., an indication provided by the licensed carrier) after the UE has woken up from DRX for the licensed carriers.

Figure 9A:
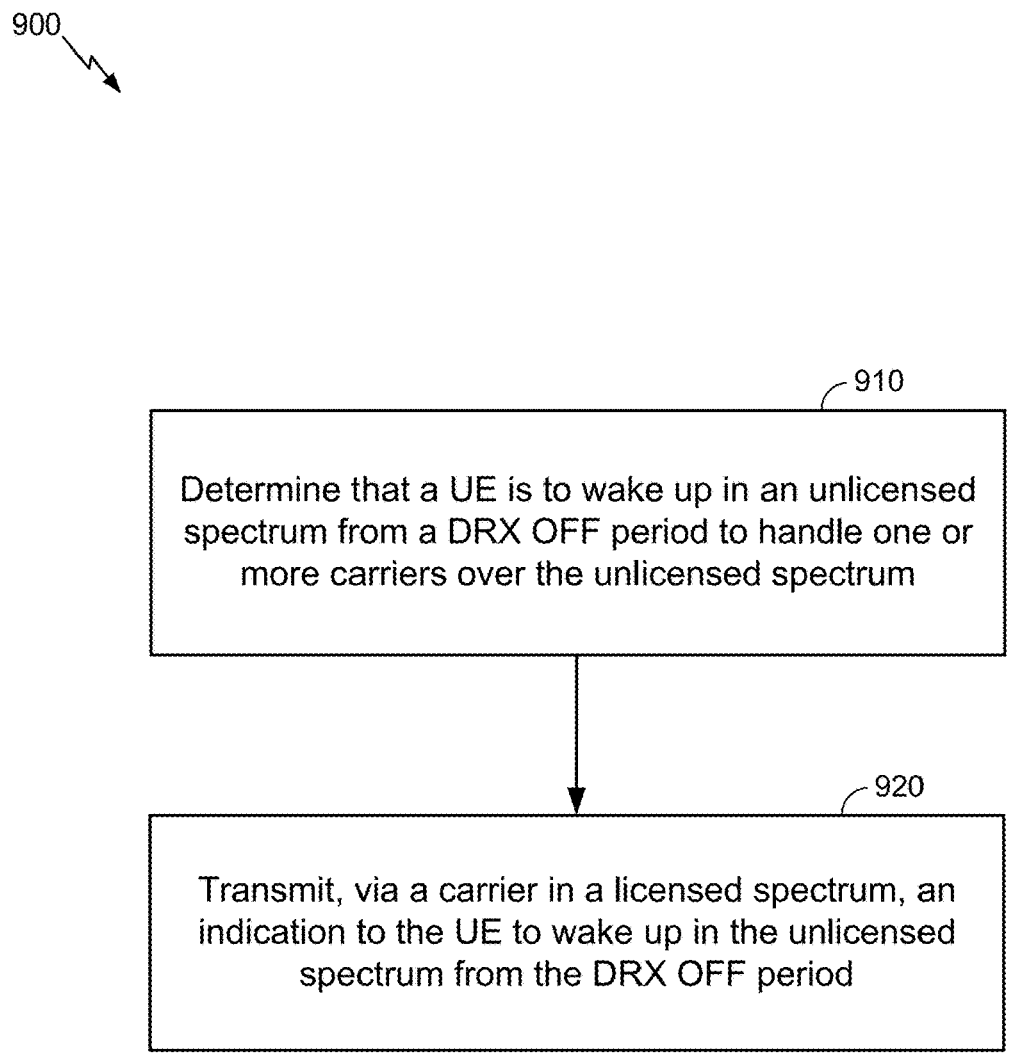
FIGS. 9A and 9B are flow diagrams illustrating examples of methods related to signaling for DRX wake up operations for licensed and unlicensed carriers in accordance with various aspects of the present disclosure.
Figure 9B:
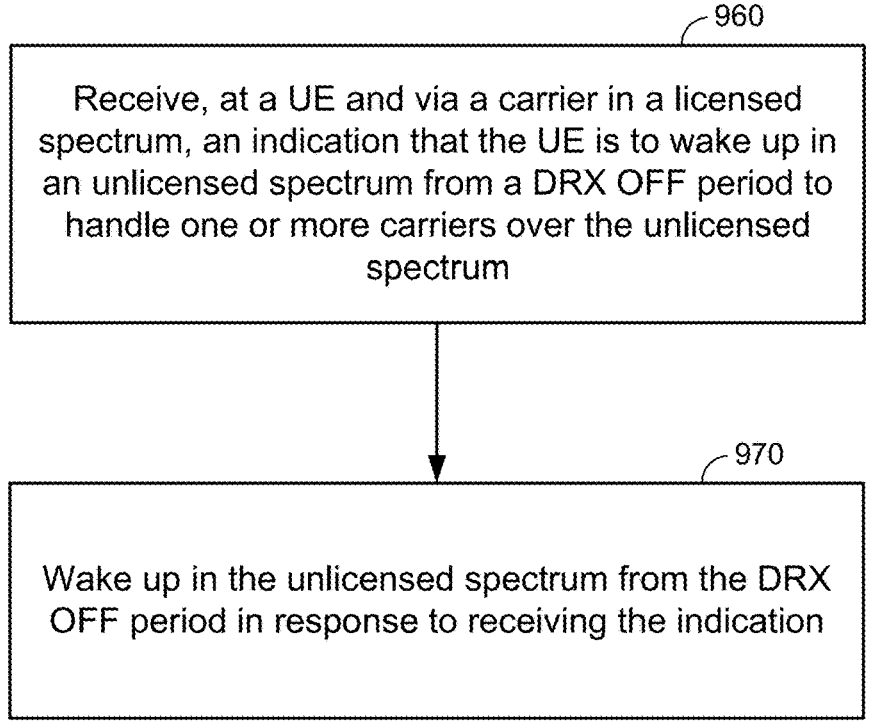

FIG. 9A and FIG. 9B are flow diagrams illustrating examples of methods related to signaling for DRX wake up operations for licensed and unlicensed carriers in accordance with various aspects of the present disclosure.

Referring to FIG. 9A, in an aspect, at block 910, method 900 includes determining that a UE is to wake up in an unlicensed spectrum from a DRX OFF period to handle one or more carriers over the unlicensed spectrum. In an aspect, for example, network entity 105, processor(s) 21, and/or memory 45 may execute unlicensed operations component 140 and/or DRX component 143 to determine that a UE (e.g., UE 115) is to wake up from DRX for unlicensed carriers. In a further aspect, processing system 1214 (FIG. 12), processor 1204, and/or memory 1206 may execute unlicensed operations component 1120 to wake up from DRX for unlicensed carriers.

At block 920, method 900 includes transmitting, via a carrier in a licensed spectrum, an indication to the UE to wake up in the unlicensed spectrum from the DRX OFF period. In an aspect, for example, network entity 105, processor(s) 21, and/or memory 45 may execute unlicensed operations component 140, DRX component 143, and/or transceiver 61 to transmit the indication to the UE to wake up for unlicensed carriers. In a further aspect, processing system 1214 (FIG. 12), processor 1204, and/or memory 1206 may execute unlicensed operations component 1120 and/or transmission component 1112 to transmit the indication to the UE to wake up for unlicensed carriers.

Referring to FIG. 9B, in an aspect, at block 960, method 950 includes receiving, at a UE and via a carrier in a licensed spectrum, an indication that the UE is to wake up in an unlicensed spectrum from a DRX OFF period to handle one or more carriers over the unlicensed spectrum. In an aspect, for example, UE 115, processor(s) 20, and/or memory 44 may execute unlicensed operations component 130, DRX component 133, and/or transceiver 60 to receive the indication over one or more licensed carriers. In a further aspect, processing system 1414 (FIG. 14), processor 1404, and/or memory 1406 may execute reception component 1304 to receive the indication over one or more licensed carriers.

At block 970, method 950 includes waking up in the unlicensed spectrum from the DRX OFF period in response to receiving the indication. In an aspect, for example, UE 115, processor(s) 20, and/or memory 44 may execute unlicensed operations component 130, DRX component 133, and/or transceiver 60 to wake up in the unlicensed spectrum to receive data or other signaling over one or more unlicensed carriers. In a further aspect, processing system 1414 (FIG. 14), processor 1404, and/or memory 1406 may execute unlicensed operations component 1320 to wake up in the unlicensed spectrum to receive data or other signaling over one or more unlicensed carriers.

Figure 10:
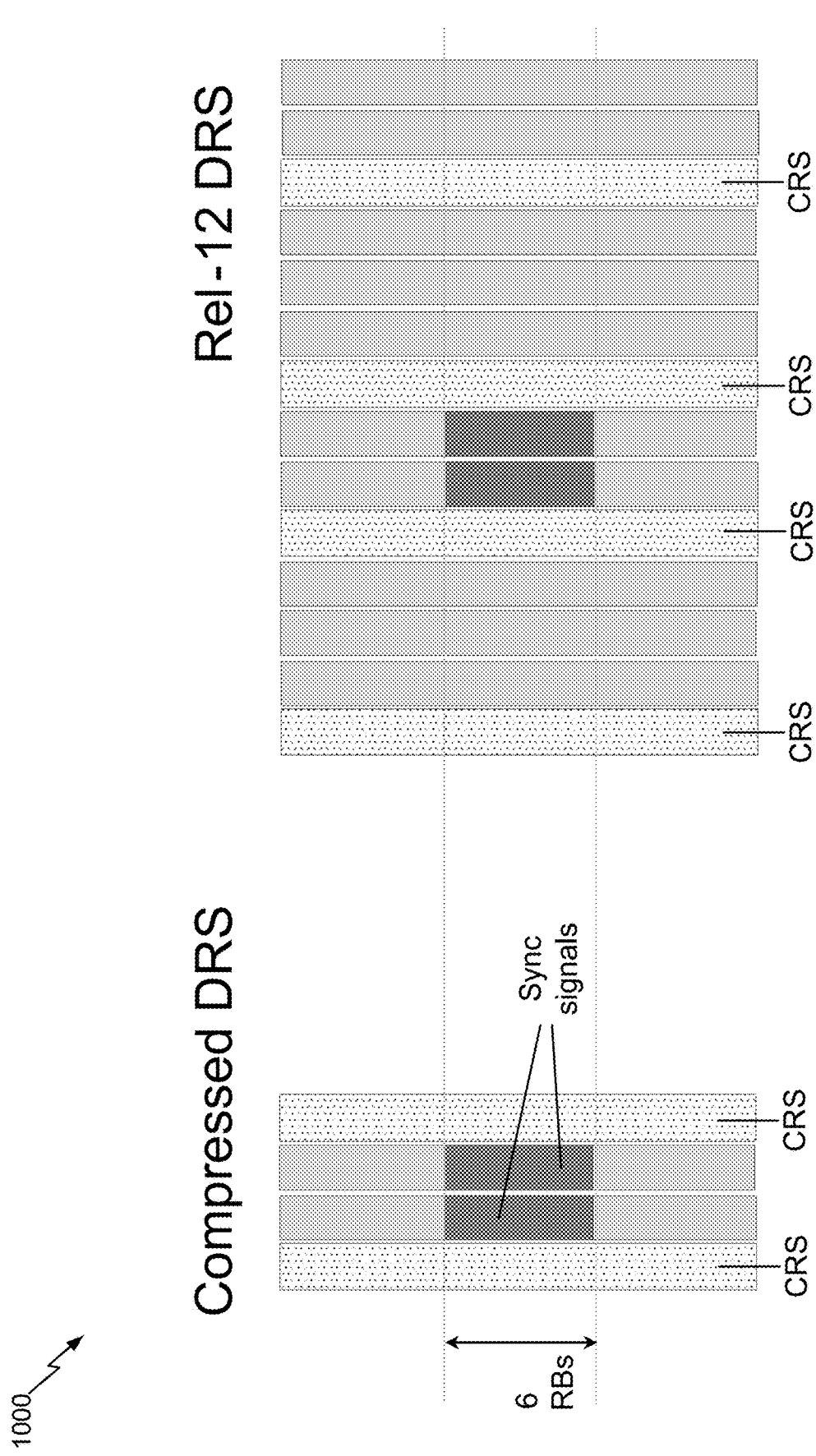
FIG. 10 is a diagram illustrating an example of Radio Resource Management (RRM) of a discovery reference signal (DRS) for licensed and unlicensed carriers in accordance with various aspects of the present disclosure.

FIG. 10 is a diagram 1000 illustrating an example a Radio Resource Management (RRM) of a discovery reference signal (DRS) for licensed and unlicensed carriers in accordance with various aspects of the present disclosure. As noted above, multiplexing CRS-based transmission modes and DM-RS transmission modes by supporting MBSFN subframes and non-MBSFN subframes within the same transmission burst so that MBSFN subframes can support DM-RS-based transmission modes and non-MBSFN subframes can support CRS-based transmission modes as well as DM-RS-based transmission modes. For example, a DRS may include a primary synchronization signal (PSS), a secondary synchronization signal (SSS), and/or a cell-specific reference signal (CRS). In an aspect, the CRS may correspond to a 1-port or 2-port CRS. Further, the DRS may optionally include Channel State Information Reference Signal (CSI-RS). Additionally, the DRS may include a public land mobile network (PLMN) indicator with TBD encoding.

In an aspect, diagram 1000 illustrates two DRS structures for downlink transmission bursts. In a first aspect, compressed DRS may be transmitted, and in a second aspect, the DRS may be transmitted in accordance with Rel-12 (i.e., Rel-12 DRS). For the downlink transmission bursts, the DRS is repeated periodically, For example, the DRS may be repeated outside of the Discovery Signal Measurement Timing Configuration (DMTC) in every subframe, such as subframe zero (0) or subframes zero (0) and five (5) relative to the primary cell (PCell) timing. Moreover, in order to support earlier implementations, the RRM measurements may be based on a predetermined number of RBs, such as the six (6) RBs located in the center of the subframe.

Figure 11:
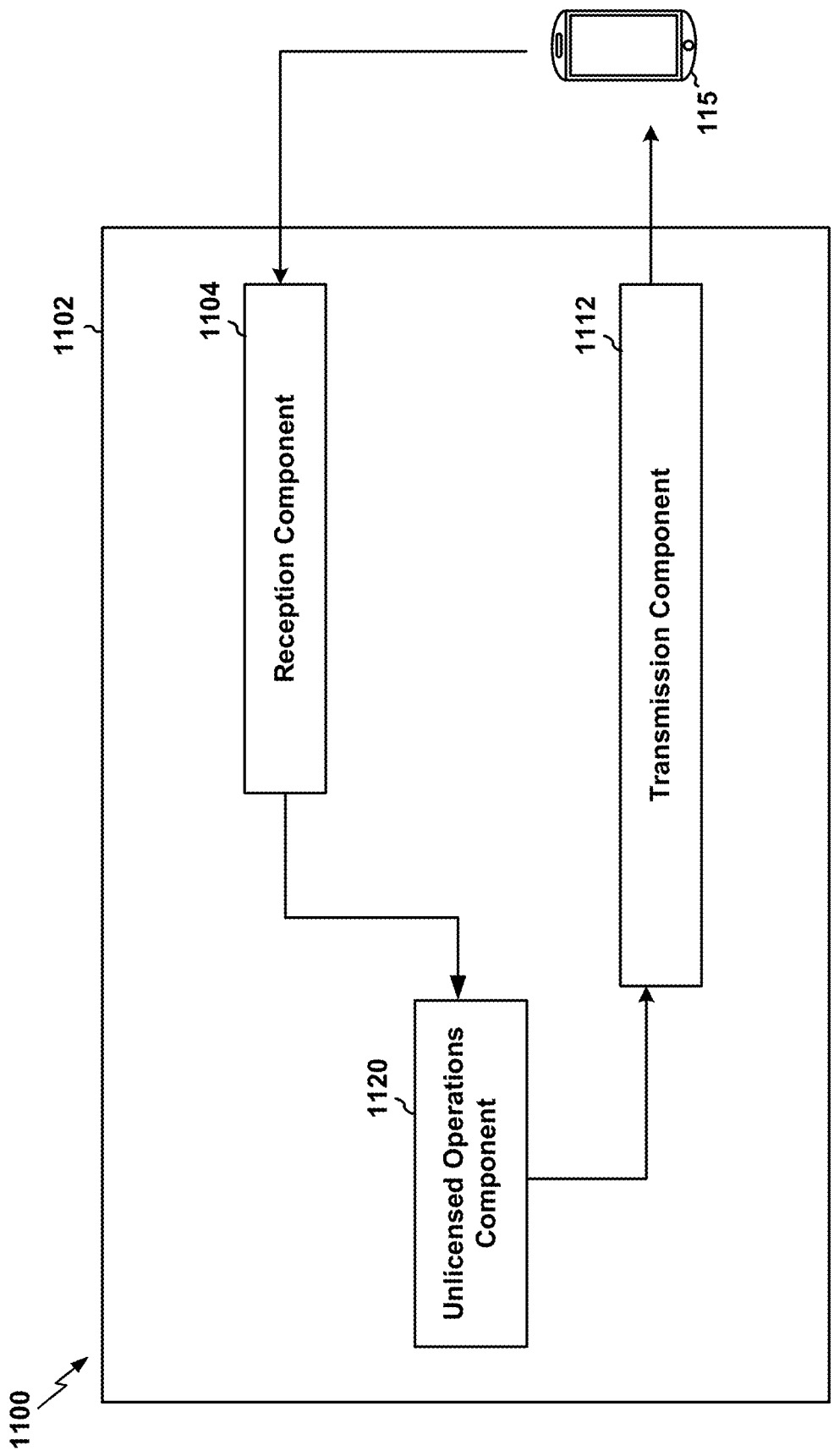
FIG. 11 is a conceptual data flow diagram illustrating the data flow between different means/components in an exemplary apparatus including a unlicensed operations component in accordance with various aspects of the present disclosure.

FIG. 11 is a conceptual data flow diagram 1100 illustrating the data flow between different means/components in an exemplary apparatus 1102 that includes unlicensed operations component 1120, which may be the same as or similar to unlicensed operations component 140. The apparatus 1102 may be a base station, which may include base station 105 of FIGS. 1 and 4B. The apparatus 1102 includes unlicensed operations component 1120 that, in an aspect, identifies a subframe configuration for WWAN communications over an unlicensed spectrum, the subframe configuration indicating whether a respective downlink subframe in a transmission burst corresponds to a MBSFN subframe or a non-MBSFN subframe, identifies aperiodically transmitted resources for CSI associated with WWAN communications over an unlicensed spectrum, and/or determine that a UE is to wake up in an unlicensed spectrum from a DRX OFF period to handle one or more carriers over the unlicensed spectrum. The apparatus 1102 further includes a transmission component 1112 that transmits an indication of the subframe configuration to at least one UEs, such as UE 115, transmits an indication of the resources and a request for aperiodic CSI reporting to a set of UE, and/or transmits, via a carrier in a licensed spectrum, an indication to the UE to wake up in the unlicensed spectrum from the DRX OFF period. Further, apparatus 1102 includes reception component 1104 that receives one or more signals from at least one of the one or more UEs.

The apparatus may include additional components that perform each of the blocks of the algorithm in the aforementioned flowcharts of FIG. 11. As such, each block in the aforementioned flowcharts of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
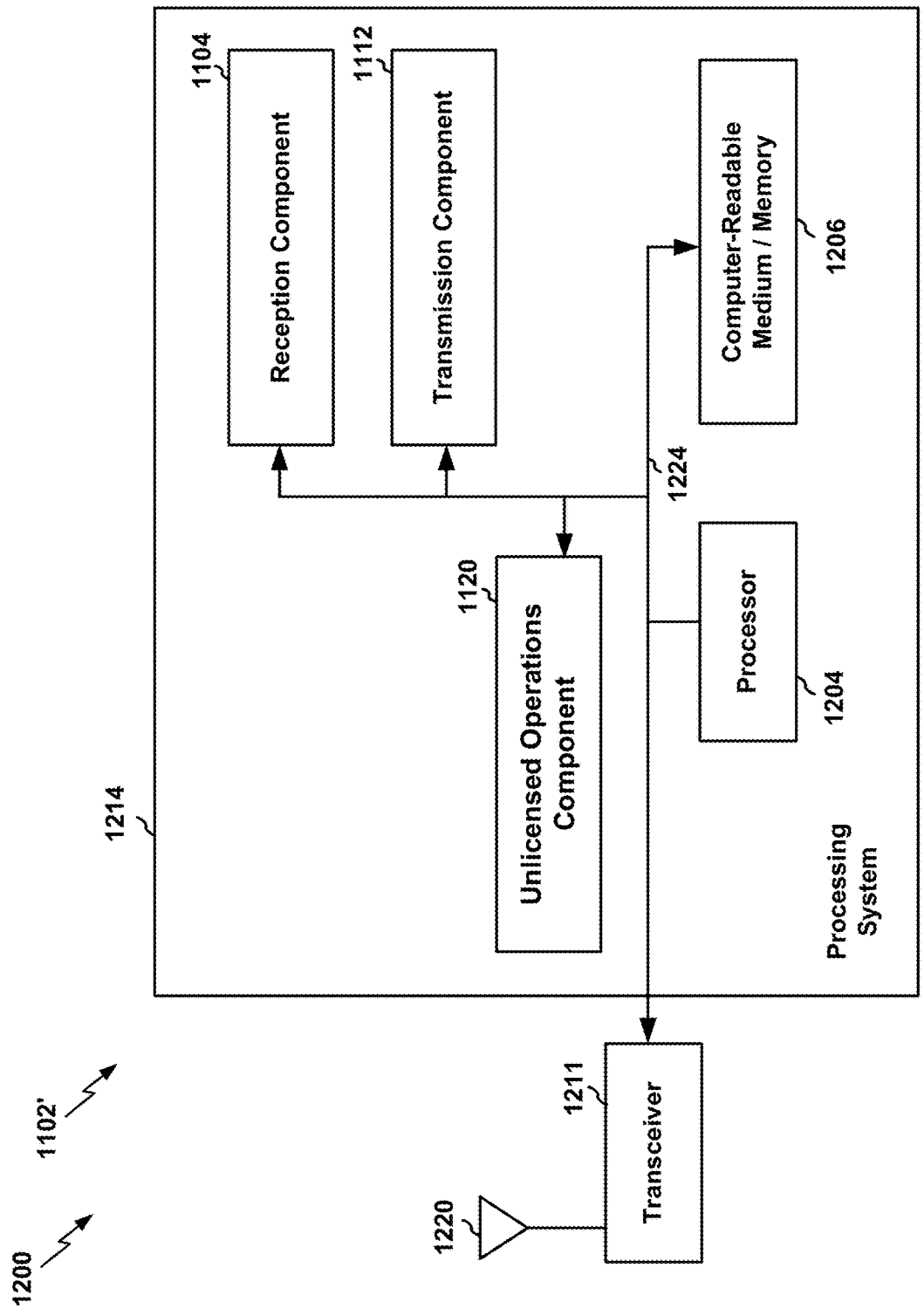
FIG. 12 is a diagram illustrating an example of a hardware implementation for an apparatus employing a processing system including a unlicensed operations component in accordance with various aspects of the present disclosure.

FIG. 12 is a diagram 1200 illustrating an example of a hardware implementation for an apparatus 1102' employing a processing system 1214 that includes unlicensed operations component 1120 (FIG. 1111), which may be the same as or similar to unlicensed operations component 140 (FIG. 4B). The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, which may be the same as or similar to processor(s) 21 (FIG. 4B), the components 1104, 1112, and 1120, and the computer-readable medium/memory 1206, which may be the same as or similar to memory 45 (FIG. 4B). The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 804. In addition, the transceiver 1210 receives information from the processing system 1214, specifically the transmission component 1112, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1112, and 1120. The components may be software components running in the processor 1204, resident/stored in the computer readable medium/memory 1206, one or more hardware components coupled to the processor 1204, or some combination thereof.

In one configuration, the apparatus 1202/1102' for wireless communication includes means for harmonizing between CRS and DM-RS based TMs in unlicensed spectrum. The apparatus includes means for identifying a subframe configuration for WWAN communications over an unlicensed spectrum, the subframe configuration indicating whether a respective downlink subframe in a transmission burst corresponds to a MBSFN subframe or a non-MBSFN subframe, identifying aperiodically transmitted resources for CSI associated with WWAN communications over an unlicensed spectrum, and/or determining that a UE is to wake up in an unlicensed spectrum from a DRX OFF period to handle one or more carriers over the unlicensed spectrum. Further, in another configuration, the apparatus 1202/1102' for wireless communication includes means for transmitting an indication of the subframe configuration to at least one UEs, such as UE 115, transmitting an indication of the resources and a request for aperiodic CSI reporting to a set of UE, and/or transmitting, via a carrier in a licensed spectrum, an indication to the UE to wake up in the unlicensed spectrum from the DRX OFF period.

The aforementioned means may be one or more of the aforementioned components of the apparatus 1202 and/or the processing system 1214 of the apparatus 802' configured to perform the functions recited by the aforementioned means. As described supra, the processing system 1214 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 13:
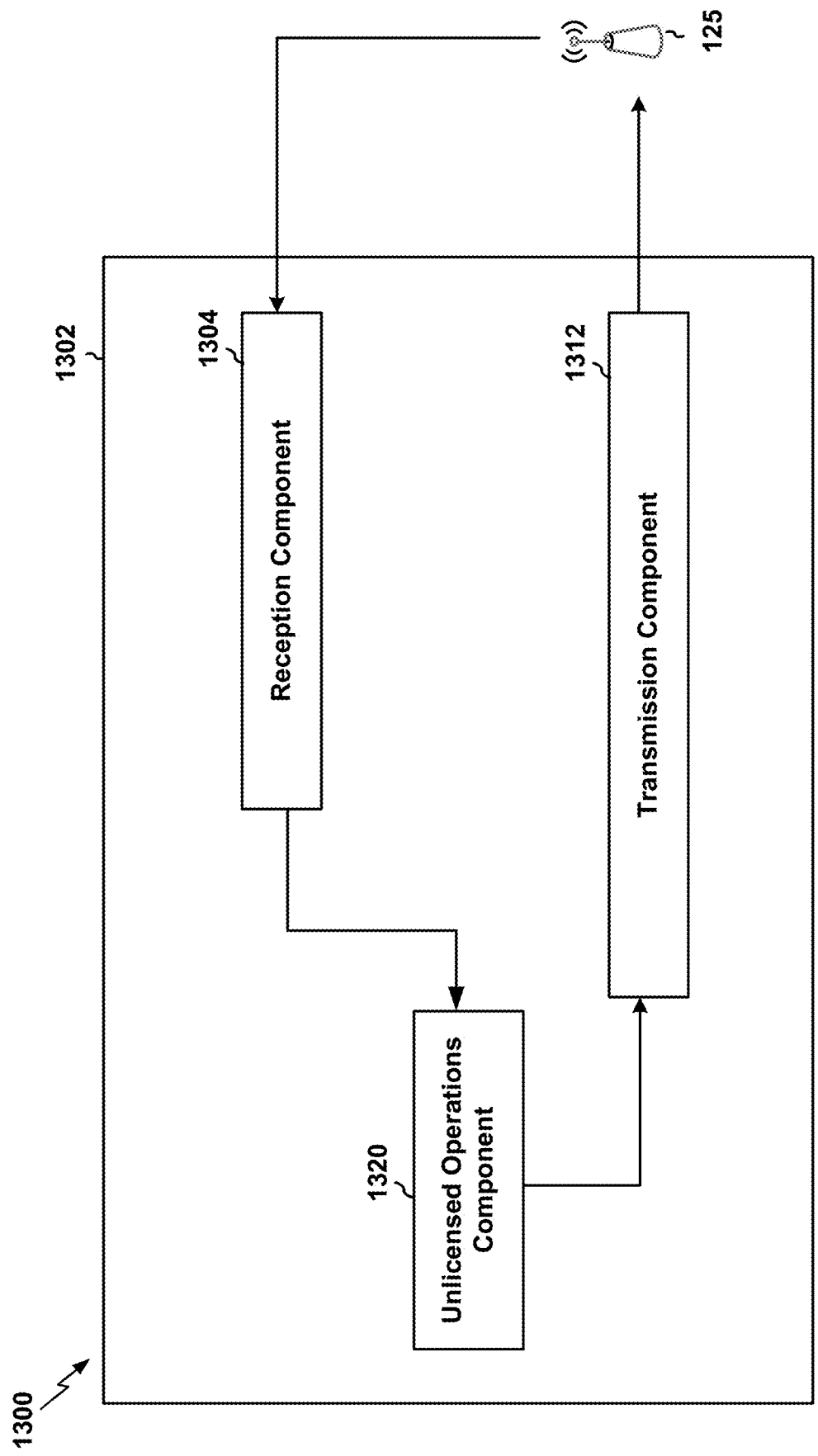
FIG. 13 is a conceptual data flow diagram illustrating the data flow between different means/components in an exemplary apparatus including a unlicensed operations component in accordance with various aspects of the present disclosure.

FIG. 13 is a conceptual data flow diagram 1300 illustrating the data flow between different means/components in an exemplary apparatus 1302 that includes communicating component 1320, which may be the same as or similar to unlicensed operations component 130. The apparatus 1302 may be a UE, which may include UE 115 of FIGS. 1 and 4A. The apparatus 1302 includes reception component 1304 that, in an aspect, receives, from a network entity, such as base station 135, an indication of a subframe configuration for WWAN communications over an unlicensed spectrum, the subframe configuration being associated with a current downlink subframe in a transmission burst, receives, from a network entity, an indication of aperiodically transmitted resources for CSI associated with WWAN communications over an unlicensed spectrum, and a request for aperiodic CSI reporting, and/or receives via a carrier in a licensed spectrum, an indication that the UE is to wake up in an unlicensed spectrum from a DRX OFF period to handle one or more carriers over the unlicensed spectrum. The apparatus 1302 includes unlicensed operations component 1320 that determines whether the current downlink subframe is a MBSFN subframe or a non-MBSFN subframe based on the indication, performs CSI measurements and the aperiodic CSI reporting based at least in part on the indication of the resources, and/or wakes up in the unlicensed spectrum from the DRX OFF period in response to receiving the indication. In an aspect, the apparatus 1302 further includes transmission component 1312 that transmits one or more signals to at least one of the one or more base stations.

The apparatus may include additional components that perform each of the blocks of the algorithm in the aforementioned flowcharts of FIG. 13. As such, each block in the aforementioned flowcharts of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
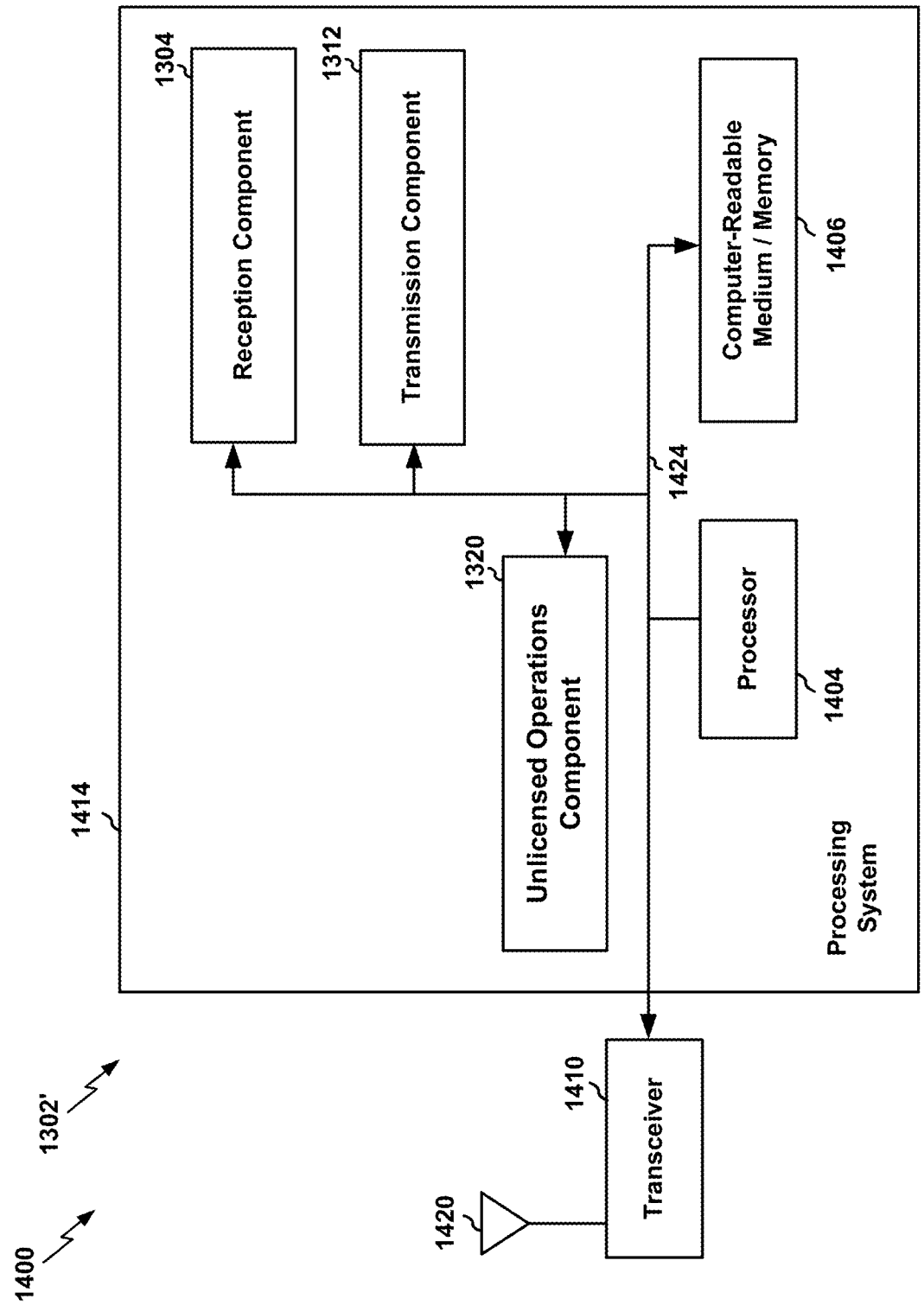
FIG. 14 is a diagram illustrating an example of a hardware implementation for an apparatus employing a processing system including a unlicensed operations component in accordance with various aspects of the present disclosure.

FIG. 14 is a diagram 1400 illustrating an example of a hardware implementation for an apparatus 1002' employing a processing system 1414 that includes unlicensed operations component 1320 (FIG. 13), which may be the same as or similar to unlicensed operations component 130 (FIG. 4A). The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, which may be the same as or similar to processor(s) 20 (FIG. 4A), the components 1304, 1310, and 1312, and the computer-readable medium/memory 1406, which may be the same as or similar to memory 44 (FIG. 4A). The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1004. In addition, the transceiver 1410 receives information from the processing system 1414, specifically the transmission component 1412, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1310, and 1312. The components may be software components running in the processor 1404, resident/stored in the computer readable medium/memory 1406, one or more hardware components coupled to the processor 1404, or some combination thereof.

In one configuration, the apparatus 1402/1302' for wireless communication includes means for receiving, from a network entity, such as base station 135, an indication of a subframe configuration for WWAN communications over an unlicensed spectrum, the subframe configuration being associated with a current downlink subframe in a transmission burst, receiving, from a network entity, an indication of aperiodically transmitted resources for CSI associated with WWAN communications over an unlicensed spectrum, and a request for aperiodic CSI reporting, and/or receiving via a carrier in a licensed spectrum, an indication that the UE is to wake up in an unlicensed spectrum from a DRX OFF period to handle one or more carriers over the unlicensed spectrum. The apparatus includes means for determining whether the current downlink subframe is a MBSFN subframe or a non-MBSFN subframe based on the indication. Further, in another configuration, the apparatus 1402/1302' for wireless communication includes means for performing CSI measurements and the aperiodic CSI reporting based at least in part on the indication of the resources. The apparatus includes means for waking up in the unlicensed spectrum from the DRX OFF period in response to receiving the indication.

The aforementioned means may be one or more of the aforementioned components of the apparatus 1402 and/or the processing system 1414 of the apparatus 1302' configured to perform the functions recited by the aforementioned means. As described supra, the processing system 1414 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the disclosure can include a computer readable medium embodying a method for dynamic bandwidth management for transmissions in unlicensed spectrum. Accordingly, the disclosure is not limited to the illustrated examples.

While the foregoing disclosure shows illustrative aspects, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method for wireless communications, comprising:
    identifying, at a network entity, a subframe configuration for wireless wide area network (WWAN) communications over an unlicensed spectrum, the subframe configuration indicating whether a respective downlink subframe in a transmission burst corresponds to a multicast-broadcast single-frequency network (MBSFN) subframe, wherein the MBSFN subframe supports a transmission mode over the unlicensed spectrum based on a demodulation reference signal (DM-RS), and wherein the subframe configuration enables support for a dynamic number of downlink and uplink subframes in each transmission burst including the transmission burst, and wherein a downlink subframe type signaling of the respective downlink subframe enables support for transmission mode multiplexing of both cell specific reference signal (CRS)-based transmission modes in non-MBSFN subframes and DM-RS-based transmission modes in MBSFN subframes within a same transmission burst, and wherein the subframe configuration further indicates a remaining number of downlink subframes in the transmission burst, including the respective downlink subframe, and a remaining number of uplink subframes in the transmission burst; and
    transmitting, by the network entity, an indication of the subframe configuration to at least one user equipment (UE), wherein a ratio of MBSFN subframes of the transmission burst ranges from 0% to 100%.

2. The method of claim 1, wherein the indication is transmitted in every valid downlink subframe.

3. The method of claim 1, wherein the indication includes at least one CRS symbol in the respective downlink subframe.

4. The method of claim 3, wherein a number of CRS symbols present in an MBSFN subframe is different from a number of CRS symbols present in a non-MBSFN subframe.

5. The method of claim 1, wherein the indication includes one of:
    at least one bit in a physical control format indicator channel (PCFICH),
    at least one bit in a physical hybrid-ARQ indicator channel (PHICH),
    at least one bit in a physical downlink control channel (PDCCH or EPDCCH), and
    at least one bit assigned to the at least one UE using layer 1 signaling.

6. The method of claim 1, further comprising identifying a next subframe configuration associated with a next downlink subframe in the transmission burst, the next subframe configuration indicating a modified number of downlink or uplink subframes in the transmission burst.

7. An apparatus for wireless communications, comprising:
    means for identifying, at a network entity, a subframe configuration for wireless wide area network (WWAN) communications over an unlicensed spectrum, the subframe configuration indicating whether a respective downlink subframe in a transmission burst corresponds to a multicast-broadcast single-frequency network (MBSFN) subframe, wherein the MBSFN subframe supports a transmission mode over the unlicensed spectrum based on a demodulation reference signal (DM-RS), and wherein the subframe configuration enables support for a dynamic number of downlink and uplink subframes in each transmission burst including the transmission burst, and wherein a downlink subframe type signaling of the respective downlink subframe enables support for transmission mode multiplexing of both cell specific reference signal (CRS)-based transmission modes in non-MBSFN subframes and DM-RS-based transmission modes in MBSFN subframes within a same transmission burst, and wherein the subframe configuration further indicates a remaining number of downlink subframes in the transmission burst, including the respective downlink subframe, and a remaining number of uplink subframes in the transmission burst; and
    means for transmitting, by the network entity, an indication of the subframe configuration to at least one user equipment (UE), wherein a ratio of MBSFN subframes of the transmission burst ranges from 0% to 100%.

8. The apparatus of claim 7, wherein the indication is transmitted in every valid downlink subframe.

9. The apparatus of claim 7, wherein the indication includes at least one CRS symbol in the respective downlink subframe.

10. The apparatus of claim 9, wherein a number of CRS symbols present in an MBSFN subframe is different from a number of CRS symbols present in a non-MBSFN subframe.

11. The apparatus of claim 7, wherein the indication includes one of:
  at least one bit in a physical control format indicator channel (PCFICH),
  at least one bit in a physical hybrid-ARQ indicator channel (PHICH),
  at least one bit in a physical downlink control channel (PDCCH or EPDCCH), and
  at least one bit assigned to the at least one UE using layer 1 signaling.

12. The apparatus of claim 7, further comprising means for identifying a next subframe configuration associated with a next downlink subframe in the transmission burst, the next subframe configuration indicating a modified number of downlink or uplink subframes in the transmission burst.

13. An apparatus for wireless communications, comprising:
  a transceiver;
  a memory configured to store data; and
  a processor communicatively coupled with the transceiver and the memory, the processor and the memory configured to execute instructions to process at least a portion of the data for:
    identifying, at a network entity, a subframe configuration for wireless wide area network (WWAN) communications over an unlicensed spectrum, the subframe configuration indicating whether a respective downlink subframe in a transmission burst corresponds to a multicast-broadcast single-frequency network (MBSFN) subframe, wherein the MBSFN subframe supports a transmission mode over the unlicensed spectrum based on a demodulation reference signal (DM-RS), and wherein the subframe configuration enables support for a dynamic number of downlink and uplink subframes in each transmission burst including the transmission burst, and wherein a downlink subframe type signaling of the respective downlink subframe enables support for transmission mode multiplexing of both cell specific reference signal (CRS)-based transmission modes in non-MBSFN subframes and DM-RS-based transmission modes in MBSFN subframes within a same transmission burst, and wherein the subframe configuration further indicates a remaining number of downlink subframes in the transmission burst, including the respective downlink subframe, and a remaining number of uplink subframes in the transmission burst; and
    transmitting, via the transceiver of the network entity, an indication of the subframe configuration to at least one user equipment (UE), wherein a ratio of MBSFN subframes of the transmission burst ranges from 0% to 100%.

14. The apparatus of claim 13, wherein the indication is transmitted in every valid downlink subframe.

15. The apparatus of claim 13, wherein the indication includes at least one CRS symbol in the respective downlink subframe.

16. The apparatus of claim 15, wherein a number of CRS symbols present in an MBSFN subframe is different from a number of CRS symbols present in a non-MBSFN subframe.

17. The apparatus of claim 13, wherein the indication includes one of:
  at least one bit in a physical control format indicator channel (PCFICH),
  at least one bit in a physical hybrid-ARQ indicator channel (PHICH),
  at least one bit in a physical downlink control channel (PDCCH or EPDCCH), and
  at least one bit assigned to the at least one UE using layer 1 signaling.

18. The apparatus of claim 13, wherein the processor and the memory are further configured to identify a next subframe configuration associated with a next downlink subframe in the transmission burst, the next subframe configuration indicating a modified number of downlink or uplink subframes in the transmission burst.

19. A non-transitory computer-readable medium storing executable code for wireless communications, comprising:
  code for identifying, at a network entity, a subframe configuration for wireless wide area network (WWAN) communications over an unlicensed spectrum, the subframe configuration indicating whether a respective downlink subframe in a transmission burst corresponds to a multicast-broadcast single-frequency network (MBSFN) subframe, wherein the MBSFN subframe supports a transmission mode over the unlicensed spectrum based on a demodulation reference signal (DM-RS), and wherein the subframe configuration enables support for a dynamic number of downlink and uplink subframes in each transmission burst including the transmission burst, and wherein a downlink subframe type signaling of the respective downlink subframe enables support for transmission mode multiplexing of both cell specific reference signal (CRS)-based transmission modes in non-MBSFN subframes and DM-RS-based transmission modes in MBSFN subframes within a same transmission burst, and wherein the subframe configuration further indicates a remaining number of downlink subframes in the transmission burst, including the respective downlink subframe, and a remaining number of uplink subframes in the transmission burst; and
  code for transmitting, by the network entity, an indication of the subframe configuration to at least one user equipment (UE), wherein a ratio of MBSFN subframes of the transmission burst ranges from 0% to 100%.

20. The non-transitory computer-readable medium of claim 19, wherein the indication is transmitted in every valid downlink subframe.

21. The non-transitory computer-readable medium of claim 19, wherein the indication includes at least one CRS symbol in the respective downlink subframe.

22. The non-transitory computer-readable medium of claim 21, wherein a number of CRS symbols present in an MBSFN subframe is different from a number of CRS symbols present in a non-MBSFN subframe.

23. The non-transitory computer-readable medium of claim 19, wherein the indication includes one of:
  at least one bit in a physical control format indicator channel (PCFICH),
  at least one bit in a physical hybrid-ARQ indicator channel (PHICH), at least one bit in a physical downlink control channel (PDCCH or EPDCCH), and
at least one bit assigned to the at least one UE using layer 1 signaling.

24. The non-transitory computer-readable medium of claim 19, further comprising code for identifying a next subframe configuration associated with a next downlink subframe in the transmission burst, the next subframe configuration indicating a modified number of downlink or uplink subframes in the transmission burst.

25. A method for wireless communications, comprising:
receiving, from a network entity, an indication of a subframe configuration for wireless wide area network (WWAN) communications over an unlicensed spectrum, the subframe configuration being associated with a current downlink subframe in a transmission burst, wherein the subframe configuration enables support for a dynamic number of downlink and uplink subframes in each transmission burst including the transmission burst, and wherein a downlink subframe type signaling of the respective downlink subframe enables support for transmission mode multiplexing of both cell specific reference signal (CRS)-based transmission modes in non-multicast-broadcast single-frequency network (non-MBSFN) subframes and demodulation reference signal (DM-RS)-based transmission modes in MBSFN subframes within a same transmission burst, and wherein the subframe configuration further indicates a remaining number of downlink subframes in the transmission burst, including the respective downlink subframe, and a remaining number of uplink subframes in the transmission burst; and
determining whether the current downlink subframe is a multicast-broadcast single-frequency network (MBSFN), wherein the MBSFN subframe supports a transmission mode over the unlicensed spectrum based on a demodulation reference signal (DM-RS), and wherein a ratio of MBSFN subframes of the transmission burst ranges from 0% to 100%.

26. The method of claim 25, wherein the indication is transmitted by the network entity in every valid downlink subframe.

27. The method of claim 25, wherein the indication includes at least one CRS symbol in the respective downlink subframe.

28. The method of claim 27, wherein a number of CRS symbols present in an MBSFN subframe is different from a number of CRS symbols present in a non-MBSFN subframe.

29. The method of claim 25, wherein the indication includes one of:
at least one bit in a physical control format indicator channel (PCFICH),
at least one bit in a physical hybrid-ARQ indicator channel (PHICH),
at least one bit in a physical downlink control channel (PDCCH or EPDCCH), and
at least one bit assigned to the at least one UE using layer 1 signaling.

30. The method of claim 25, further comprising receiving a next subframe configuration associated with a next downlink subframe in the transmission burst, the next subframe configuration indicating a modified number of downlink or uplink subframes in the transmission burst.

31. An apparatus for wireless communications, comprising:

means for receiving, from a network entity, an indication of a subframe configuration for wireless wide area network (WWAN) communications over an unlicensed spectrum, the subframe configuration being associated with a current downlink subframe in a transmission burst, wherein the subframe configuration enables support for a dynamic number of downlink and uplink subframes in each transmission burst including the transmission burst, and wherein a downlink subframe type signaling of the respective downlink subframe enables support for transmission mode multiplexing of both cell specific reference signal (CRS)-based transmission modes in non-multicast-broadcast single-frequency network (non-MBSFN) subframes and demodulation reference signal (DM-RS)-based transmission modes in MBSFN subframes within a same transmission burst, and wherein the subframe configuration further indicates a remaining number of downlink subframes in the transmission burst, including the respective downlink subframe, and a remaining number of uplink subframes in the transmission burst; and
means for determining whether the current downlink subframe is a multicast-broadcast single-frequency network (MBSFN) subframe, wherein the MBSFN subframe supports a transmission mode over the unlicensed spectrum based on a demodulation reference signal (DM-RS), and wherein a ratio of MBSFN subframes of the transmission burst ranges from 0% to 100%.

32. The apparatus of claim 31, wherein the indication is transmitted by the network entity in every valid downlink subframe.

33. The apparatus of claim 31, wherein the indication includes at least one CRS symbol in the respective downlink subframe.

34. The apparatus of claim 33, wherein a number of CRS symbols present in an MBSFN subframe is different from a number of CRS symbols present in a non-MBSFN subframe.

35. The apparatus of claim 31, wherein the indication includes one of:
at least one bit in a physical control format indicator channel (PCFICH),
at least one bit in a physical hybrid-ARQ indicator channel (PHICH),
at least one bit in a physical downlink control channel (PDCCH or EPDCCH), and
at least one bit assigned to the at least one UE using layer 1 signaling.

36. The apparatus of claim 31, further comprising means for receiving a next subframe configuration associated with a next downlink subframe in the transmission burst, the next subframe configuration indicating a modified number of downlink or uplink subframes in the transmission burst.

37. An apparatus for wireless communications, comprising:
a transceiver;
a memory configured to store data; and
a processor communicatively coupled with the transceiver and the memory, the processor and the memory configured to execute instructions to process at least a portion of the data for:
receiving, via the transceiver and from a network entity, an indication of a subframe configuration for wireless wide area network (WWAN) communications over an unlicensed spectrum, the subframe configuration being associated with a current downlink subframe in a transmission burst, wherein the subframe configuration enables support for a dynamic number of downlink and uplink subframes in each transmission burst including the transmission burst, and wherein a downlink subframe type signaling of the respective downlink subframe enables support for transmission mode multiplexing of both cell specific reference signal (CRS)-based transmission modes in non-multicast-broadcast single-frequency network (non-MBSFN) subframes and demodulation reference signal (DM-RS)-based transmission modes in MBSFN subframes within a same transmission burst, and wherein the subframe configuration further indicates a remaining number of downlink subframes in the transmission burst, including the respective downlink subframe, and a remaining number of uplink subframes in the transmission burst; and determining whether the current downlink subframe is a multicast-broadcast single-frequency network (MBSFN) subframe, wherein the MBSFN subframe supports a transmission mode over the unlicensed spectrum based on a demodulation reference signal (DM-RS), and wherein a ratio of MBSFN subframes of the transmission burst ranges from 0% to 100%.

38. The apparatus of claim 37, wherein the indication is transmitted by the network entity in every valid downlink subframe.

39. The apparatus of claim 37, wherein the indication includes at least one CRS symbol in the respective downlink subframe.

40. The apparatus of claim 39, wherein a number of CRS symbols present in an MBSFN subframe is different from a number of CRS symbols present in a non-MBSFN subframe.

41. The apparatus of claim 37, wherein the indication includes one of:
at least one bit in a physical control format indicator channel (PCFICH),
at least one bit in a physical hybrid-ARQ indicator channel (PHICH),
at least one bit in a physical downlink control channel (PDCCH or EPDCCH), and
at least one bit assigned to the at least one UE using layer 1 signaling.

42. The apparatus of claim 37, wherein the processor and the memory are further configured to receive a next subframe configuration associated with a next downlink subframe in the transmission burst, the next subframe configuration indicating a modified number of downlink or uplink subframes in the transmission burst.

43. A non-transitory computer-readable medium storing executable code for wireless communications, comprising:
code for receiving, from a network entity, an indication of a subframe configuration for wireless wide area network (WWAN) communications over an unlicensed spectrum, the subframe configuration being associated with a current downlink subframe in a transmission burst, wherein the subframe configuration enables support for a dynamic number of downlink and uplink subframes in each transmission burst including the transmission burst, and wherein a downlink subframe type signaling of the respective downlink subframe enables support for transmission mode multiplexing of both cell specific reference signal (CRS)-based transmission modes in non-multicast-broadcast single-frequency network (non-MBSFN) subframes and demodulation reference signal (DM-RS)-based transmission modes in MBSFN subframes within a same transmission burst, and wherein the subframe configuration further indicates a remaining number of downlink subframes in the transmission burst, including the respective downlink subframe, and a remaining number of uplink subframes in the transmission burst; and code for determining whether the current downlink subframe is a multicast-broadcast single-frequency network (MBSFN) subframe, wherein the MBSFN subframe supports a transmission mode over the unlicensed spectrum based on a demodulation reference signal (DM-RS), and wherein a ratio of MBSFN subframes of the transmission burst ranges from 0% to 100%.

44. The non-transitory computer-readable medium of claim 43, wherein the indication is transmitted by the network entity in every valid downlink subframe.

45. The non-transitory computer-readable medium of claim 43, wherein the indication includes at least one CRS symbol in the respective downlink subframe.

46. The non-transitory computer-readable medium of claim 45, wherein a number of CRS symbols present in an MBSFN subframe is different from a number of CRS symbols present in a non-MBSFN subframe.

47. The non-transitory computer-readable medium of claim 43, wherein the indication includes one of:
at least one bit in a physical control format indicator channel (PCFICH),
at least one bit in a physical hybrid-ARQ indicator channel (PHICH),
at least one bit in a physical downlink control channel (PDCCH or EPDCCH), and
at least one bit assigned to the at least one UE using layer 1 signaling.

48. The non-transitory computer-readable medium of claim 43, further comprising code for receiving a next subframe configuration associated with a next downlink subframe in the transmission burst, the next subframe configuration indicating a modified number of downlink or uplink subframes in the transmission burst.

* * * * *